US009013749B2

(12) United States Patent
Miyazaki

(10) Patent No.: US 9,013,749 B2
(45) Date of Patent: Apr. 21, 2015

(54) IMAGE READING APPARATUS, IMAGE FORMING DEVICE, AND METHOD FOR CONTROLLING READING SO FREQUENCY OF PULSE SIGNAL TO STEPPER MOTOR REDUCES VIBRATION DURING QUIET SCANNING MODE

(71) Applicant: KYOCERA Document Solutions Inc., Osaka (JP)

(72) Inventor: Tadashi Miyazaki, Osaka (JP)

(73) Assignee: KYOCER Document Solutions Inc., Osaka (JP)

( * ) Notice: Subject to any disclaimer, the term of this patent is extended or adjusted under 35 U.S.C. 154(b) by 0 days.

(21) Appl. No.: 14/312,054

(22) Filed: Jun. 23, 2014

(65) Prior Publication Data

US 2015/0002910 A1   Jan. 1, 2015

(30) Foreign Application Priority Data

Jun. 28, 2013   (JP) .................................. 2013-136568

(51) Int. Cl.
| | |
|---|---|
| H04N 1/04 | (2006.01) |
| H04N 1/393 | (2006.01) |
| H04N 1/31 | (2006.01) |
| H04N 1/028 | (2006.01) |
| H04N 1/00 | (2006.01) |

(52) U.S. Cl.
CPC ............... *H04N 1/31* (2013.01); *H04N 1/3935* (2013.01); *H04N 1/02855* (2013.01); *H04N 1/0057* (2013.01)

(58) Field of Classification Search
None
See application file for complete search history.

(56) References Cited

U.S. PATENT DOCUMENTS

| | | | | |
|---|---|---|---|---|
| 5,001,410 A | * | 3/1991 | Ono ............................... 318/696 |
| 5,151,640 A | * | 9/1992 | Sakamoto et al. ............ 318/696 |
| 5,583,620 A | * | 12/1996 | Miyamoto ..................... 318/685 |
| 6,490,057 B1 | * | 12/2002 | Sakaguchi ..................... 358/412 |
| 6,765,698 B1 | * | 7/2004 | Ha ................................. 358/474 |
| 6,816,288 B1 | * | 11/2004 | Hashizume ................... 358/474 |
| 6,920,296 B2 | * | 7/2005 | Koike .............................. 399/17 |
| 6,927,880 B2 | * | 8/2005 | Hashizume ................... 358/412 |
| 7,006,260 B2 | * | 2/2006 | Sato et al. ..................... 358/474 |
| 7,129,671 B2 | * | 10/2006 | Fukamizu et al. ............ 318/685 |
| 7,592,759 B2 | * | 9/2009 | Shibatani ...................... 318/685 |
| 7,826,105 B2 | * | 11/2010 | Yamaguchi ................... 358/474 |
| 8,913,266 B2 | * | 12/2014 | Ikebata et al. ................ 358/474 |
| 2009/0315503 A1 | * | 12/2009 | Yoshihisa et al. ............. 318/685 |

FOREIGN PATENT DOCUMENTS

| | | | | |
|---|---|---|---|---|
| JP | 57147372 A | * | 9/1982 | ............... H04N 1/10 |
| JP | 2012-53374 A | | 3/2012 | |

* cited by examiner

*Primary Examiner* — Scott A Rogers
(74) *Attorney, Agent, or Firm* — Stein IP, LLC

(57) ABSTRACT

A light source section of the image reading apparatus illuminates a document with light. An image sensor outputs image signals. An operating section accepts input of an enlargement factor and selection of a document scanning mode. An image processing section generates image data, from pixels (lines) in a quantity according to an enlargement factor. A stepper motor moves the document or the light source section. During a quiet mode, a signal generating section inputs to the stepper motor a pulse signal of a fixed frequency within a quiet mode frequency band. The quiet mode frequency band is a frequency band in which vibration of the stepper motor is at or below a predetermined normal vibration level.

12 Claims, 10 Drawing Sheets

FIG.5

(NORMAL MODE)

| FIRST STEPPER MOTOR ||||| 
|---|---|---|---|---|
| MODE | ENLARGEMENT FACTOR [%] | FREQUENCY [pps] | IMAGE PROCESSING (SUB-SCANNING) | IMAGE PROCESSING (MAIN SCANNING) |
| NORMAL | 25~99 | fa | THINNING | THINNING |
| | 100 | fa | NONE | NONE |
| | 101~200 | $1/2fa \leqq fx < fa$ | NONE | INTERPOLATION |
| SECOND STEPPER MOTOR |||||
| MODE | ENLARGEMENT FACTOR [%] | FREQUENCY [pps] | IMAGE PROCESSING (SUB-SCANNING) | IMAGE PROCESSING (MAIN SCANNING) |
| NORMAL | 25~99 | fb | THINNING | THINNING |
| | 100 | fb | NONE | NONE |
| | 101~200 | $1/2fb \leqq fy < fb$ | NONE | INTERPOLATION |

FIG.7

(QUIET MODE)

| FIRST STEPPER MOTOR | | | | |
|---|---|---|---|---|
| MODE | ENLARGEMENT FACTOR [%] | FREQUENCY [pps] | IMAGE PROCESSING (SUB-SCANNING) | IMAGE PROCESSING (MAIN SCANNING) |
| QUIET | 25~99 | f1 | THINNING | THINNING |
| | 100 | f1 | THINNING | NONE |
| | 101~(Z1-1) | f1 | THINNING | INTERPOLATION |
| | Z1 | f1 | NONE | INTERPOLATION |
| | (Z1+1)~200 | f1 | INTERPOLATION | INTERPOLATION |
| SECOND STEPPER MOTOR | | | | |
| MODE | ENLARGEMENT FACTOR [%] | FREQUENCY [pps] | IMAGE PROCESSING (SUB-SCANNING) | IMAGE PROCESSING (MAIN SCANNING) |
| QUIET | 25~99 | f2 | THINNING | THINNING |
| | 100 | f2 | THINNING | NONE |
| | 101~(Z2-1) | f2 | THINNING | INTERPOLATION |
| | Z2 | f2 | NONE | INTERPOLATION |
| | (Z2+1)~200 | f2 | INTERPOLATION | INTERPOLATION |

FIG.10

| MODE | ENLARGEMENT FACTOR [%] | FREQUENCY [pps] | IMAGE PROCESSING (SUB-SCANNING) | IMAGE PROCESSING (MAIN SCANNING) |
|---|---|---|---|---|
| NORMAL | 25~99 | 3400 | THINNING | THINNING |
| | 100 | 3400 | NONE | NONE |
| | 101~200 | 3383~1700 | NONE | INTERPOLATION |
| QUIET | 25~99 | 2601 | THINNING | THINNING |
| | 100 | 2601 | THINNING | NONE |
| | 101~146 | 2601 | THINNING | INTERPOLATION |
| | 147 | 2601 | NONE | INTERPOLATION |
| | 148~200 | 2601 | INTERPOLATION | INTERPOLATION |

IMAGE READING APPARATUS, IMAGE FORMING DEVICE, AND METHOD FOR CONTROLLING READING SO FREQUENCY OF PULSE SIGNAL TO STEPPER MOTOR REDUCES VIBRATION DURING QUIET SCANNING MODE

CROSS-REFERENCE TO RELATED APPLICATIONS

This application is based upon and claims the benefit of priority from the corresponding Japanese Patent Application No. 2013-136568, filed Jun. 28, 2013, the entire contents of which are incorporated herein by reference.

BACKGROUND OF THE INVENTION

The present disclosure relates to an image reading apparatus for scanning documents, an image forming device, and a method for controlling an image reading apparatus.

An image reading apparatus scans a document and generates image data. In some cases, an image reading apparatus is provided to an image formation device, such as a multifunctional peripheral, copier, fax machine, or the like. Noise arises during document scanning operations. Moreover, in cases in which a copy job or the like [is executed] by an image forming device, when document scanning and printing are performed in parallel, considerable noise is generated. In most cases, image reading apparatuses and image forming devices are situated in workplaces, such as companies and government offices. For this reason, it is preferable for [such devices] to generate less noise. Thus, in some cases, image forming devices are equipped with a mode for suppressing the sound arising during printing operations.

Image forming devices such as the following are known [in the prior art]. Specifically, one known image forming device optically scans documents, and accepts selection of a normal mode or a reduced-noise operation mode; and when the reduced-noise operation mode has been selected, in cases in which both a document scanning operation and a printing operation are to be executed, controls the interval of overlapping operation of the auto-scan operation, during which a document is scanned by the scanning section while being fed by the document auto-conveying device, and the printing operation by the print engine section, such that this interval is shorter than when normal mode has been selected. Through this configuration, operating noise generated in cases in which both a document scanning operation and a printing operation are performed [simultaneously] is suppressed.

In image reading apparatuses, there are cases in which a stepper motor is employed for document conveying, for move of the light source section, and so on. A stepper motor rotates through input of a pulse signal. Vibration arises based on rotation of the stepper motor.

The magnitude of the vibration arising based on rotation of a stepper motor varies in accordance with the frequency of the pulse signal. In particular, the closer the frequency is to one at which characteristic vibration arises, the greater is the vibration that arises on the basis of rotation of the stepper motor. As a result, depending on the frequency of the pulse signal, there may be cases in which noise due to vibration (sometimes termed "chattering noise") arises.

In image reading apparatuses, it is necessary to input to the stepper motor a pulse signal of a frequency that will not result in high levels of noise due to vibration. However, the frequency of the pulse signal such that characteristic vibration would arise (such that the stepper motor or the like vibrates through resonance) will vary according to factors such as the shape of the stepper motor case, the method of attachment of the stepper motor to the frame, and the like.

The rotation speed of a stepper motor is determined on the basis of the rotation speed required to meet specifications. For this reason, in some cases, the frequency of the pulse signal is not set in a manner that takes noise caused by vibration into consideration. While selection of the frequency of the pulse signal and of the stepper motor is performed during the initial design stage with a view to suppressing noise caused by vibration, modifications to the rotation speed of the stepper motor necessitated by the need to improve the scanning speed, modifications to the shape of the case, or modifications to the method of attachment of the stepper motor due to improvements or design modifications, may in some cases lead ex post facto to considerable vibration on the basis of rotation of the stepper motor, and to noise based on vibration.

Additionally, in an image reading apparatus, the move speed of the document and of the light source section is varied to match the enlargement factor during scanning of a document. The greater the enlargement factor for scanning the document is, the slower the move speed of the document and of the light source section will be, and the narrower will be the width per line in the sub-scanning direction. Stated another way, the greater the enlargement factor is, the greater the scanning resolution in the scan will be. For example, when the enlargement factor is 200%, the move speed of the document and the light source section is one-half that when the enlargement factor is 100%. Such a scanning system is in some cases referred to as an "optical zoom system."

When the move speed of the document and the light source section is varied to match the enlargement factor during scanning of a document, the rotation speed of the stepper motor also changes in accordance with the enlargement factor. Therefore, depending on the enlargement factor, there are cases in which the frequency of the pulse signal may be a frequency that leads to considerable vibration on the basis of rotation of the stepper motor, and to noise based on vibration. Stated another way, depending on the enlargement factor, there are cases in which a pulse signal of a frequency such that chattering vibration will arise is input to the stepper motor. In this way, there exist certain enlargement factors, at which the noise arising during operation of the image reading apparatus becomes considerable.

In the past, expensive stepper motors of low-vibration type were adopted in some cases, in order to suppress the level of vibration on the basis of rotation of the stepper motor, and noise based on such vibration. In some cases, other measures, such as providing additional vibration-damping members such as rubber, or sheets that convert vibration to heat, were adopted. For this reason, a problem encountered in the past was that, in some cases, suppression of vibration and of noise arising due to vibration led to a higher manufacturing cost of the image reading apparatus.

The prior art techniques discussed above merely involve setting to zero, or shortening to the greatest extent possible, the duration of overlap between the scanning operation and the printing operation, so as to suppress noise generated by an image forming device. Consequently, such techniques cannot solve the problem of cases of high levels of vibration arising during scanning of a document, and of noise generated by vibration, encountered when stepper motors are employed.

SUMMARY OF THE INVENTION

The image reading apparatus according to a first aspect of the present disclosure includes a light source section, image sensor, optical system member, operating section, image processing section, stepper motor, and signal generating section. The light source section illuminates a document with light. The image sensor receives reflected light from the document, and outputs an image signal in single-line units in a main scanning direction. The optical system member directs the reflected light from the document to the image sensor. The operating section accepts input of an enlargement factor at which to scan the document, and accepts selection of a scanning mode for the document, including a normal mode and a quiet mode. The image processing section, on the basis of the image signals outputted by the image sensor, generates image data of the document, from pixels in a quantity according to the enlargement factor that was set from the operating section. The stepper motor prompts movement by either the document or the light source section, or both. The signal generating section generates a pulse signal, the generated pulse signal being input to the stepper motor, prompting the stepper motor to rotate at a speed in accordance with the frequency of the generated pulse signal. During scanning in the quiet mode, the signal generating section generates and inputs to the stepper motor a pulse signal of a frequency contained within a predetermined quiet mode frequency band. The quiet mode frequency band is a frequency band in which vibration based on rotation of the stepper motor is at or below a predetermined normal vibration level.

The image forming device according to a second aspect of the present disclosure includes the aforedescribed image reading apparatus, and a print engine section for conveying the paper while performing printing on the basis of image data generated by the image reading apparatus, the print engine section performing printing at a lower printing speed when the quiet mode has been selected, than when the normal mode has been selected.

The method for controlling an image reading apparatus according to a third aspect of the present disclosure includes: prompting the light source section to illuminate a document with light; prompting the image sensor, on the basis of reflected light from the document, to output image signals in single-line units in a main scanning direction; directing the reflected light from the document onto the image sensor; accepting input of an enlargement factor at which to scan the document; accepting selection of document scanning modes including a normal mode and a quiet mode; on the basis of the image signals outputted by the image sensor, generating image data of the document, from pixels in a quantity according to the enlargement factor that was set from the operating section; prompting either the document or the light source section, or both, to be moved by the stepper motor; generating a pulse signal, and inputting the generated pulse signal to the stepper motor; prompting the stepper motor to rotate at a speed in accordance with the frequency of the generated pulse signal; and during scanning in the quiet mode, generating and inputting to the stepper motor a pulse signal of a frequency contained within a predetermined quiet mode frequency band (a frequency band in which vibration based on rotation of the stepper motor is at or below a predetermined normal vibration level).

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 is a diagram describing scanning in normal mode;
FIG. 7 is a diagram describing scanning in quiet mode;
FIG. 10 is a diagram showing an example of pulse signal frequencies input to the first stepper motor, and the specifics of image processing, in normal mode and in quiet mode, when performing a scan while conveying a document.

DETAILED DESCRIPTION OF THE EMBODIMENTS

The embodiment of the present disclosure will be described below, employing FIG. 1 to FIG. 10. In the following description, the description takes the example of a multifunctional peripheral 100 (corresponding to the image forming device) that includes an image reading apparatus 10. However, the configuration, placement, and other elements disclosed in the present embodiment are merely descriptive examples, and do not limit the scope of the disclosure.

(Configuration of Multifunctional Peripheral 100)

Figure 1:
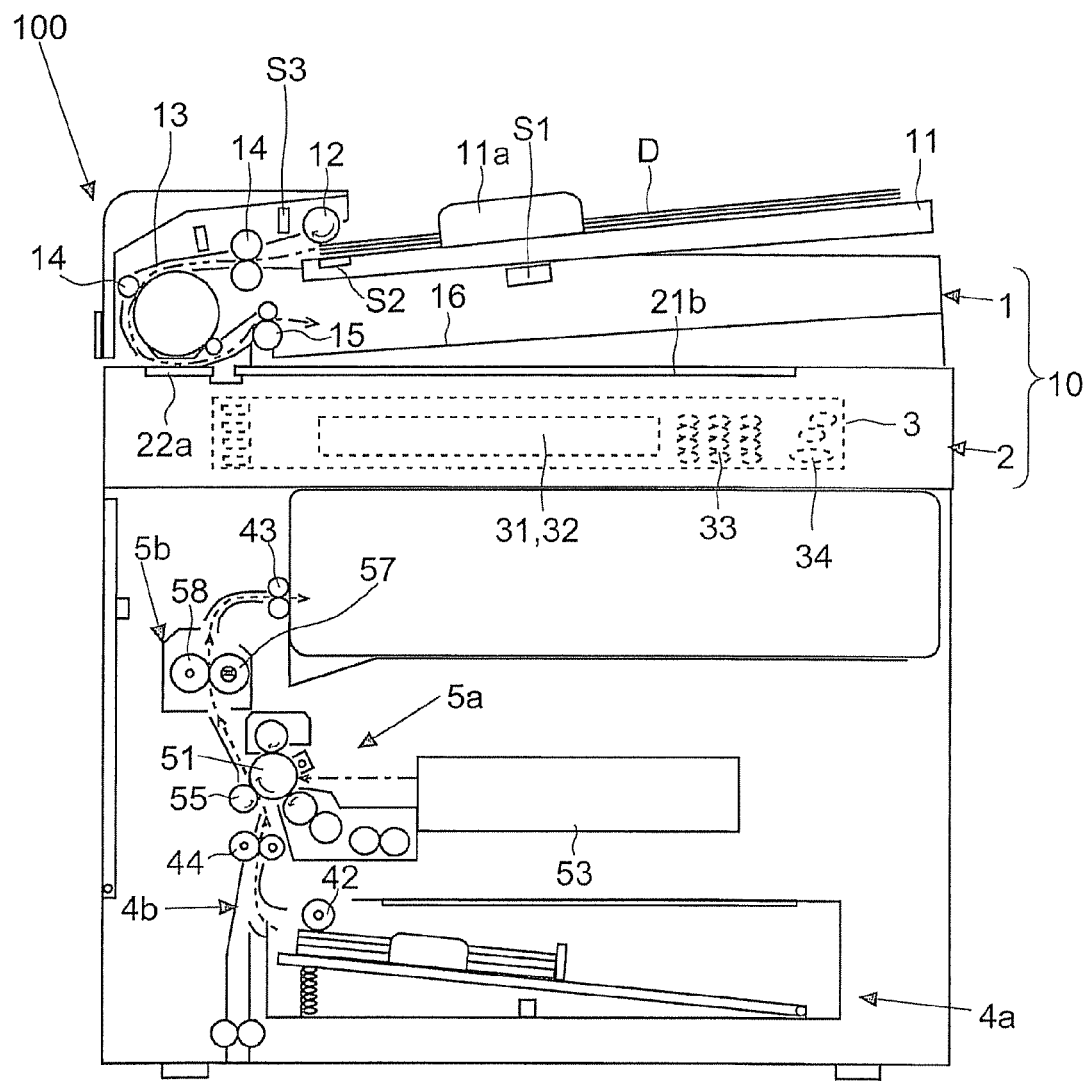
FIG. 1 is a diagram showing a multifunctional peripheral.

Firstly, an overview of the multifunctional peripheral 100 according to the embodiment will be described using FIG. 1. FIG. 1 is a diagram showing the multifunctional peripheral 100.

The multifunctional peripheral 100 of the present embodiment is furnished in an upper portion thereof with the image reading apparatus 10 which includes a document conveying section 1 and an image scanning section 2 (discussed in detail below). At the upper front face of the multifunctional peripheral 100 (the location shown by broken lines in FIG. 1) there is furnished an operating panel 3 (corresponding to the operating section) for accepting various settings, such as scanning or copying of a document D, a [fax] transmission, or the like, and for displaying the status of the multifunctional peripheral 100. The inside of the multifunctional peripheral 100 is furnished, by way of a print engine section, with a paper supply section 4a, a conveying section 4b, an image forming section 5a, a fixing section 5b, and the like.

As shown by the broken lines in FIG. 1, the operating panel 3 is furnished at the upper front face of the multifunctional peripheral 100 (at the front face of the image scanning section 2). The operating panel 3 includes a touch panel section 31 and a display section 32. The operating panel 3 is furnished with hard keys, such as a ten-key section 33 for inputting numbers or the like, as a start key 34 for instructing initiation of execution of jobs, and the like. Through soft keys and hard keys, the operating panel 3 accepts input of job settings, such as selection of normal mode or quiet mode, setting of the enlargement ratio, and the like.

The paper supply section 4a is furnished in the lower part of the multifunctional peripheral 100. The paper supply section 4a includes a paper supply roller 42 that, during printing, sends and advances paper one page at a time. The conveying section 4b includes a conveying roller pair 43 that rotates in order to convey the paper, and a resist roller pair 44 for sending the paper to the image forming section 5a, in synchronized fashion with the timing of formation of toner images. The image forming section 5a forms images (toner images) and transfers the toner images to the paper. The image forming section 5a includes a photosensitive drum 51 and a transfer roller 55. The fixing section 5b includes a heated roller 57 and a pressure roller 58 for fixing the toner images transferred to the paper.

(Configuration of Image Reading Apparatus 10)

Figure 2:
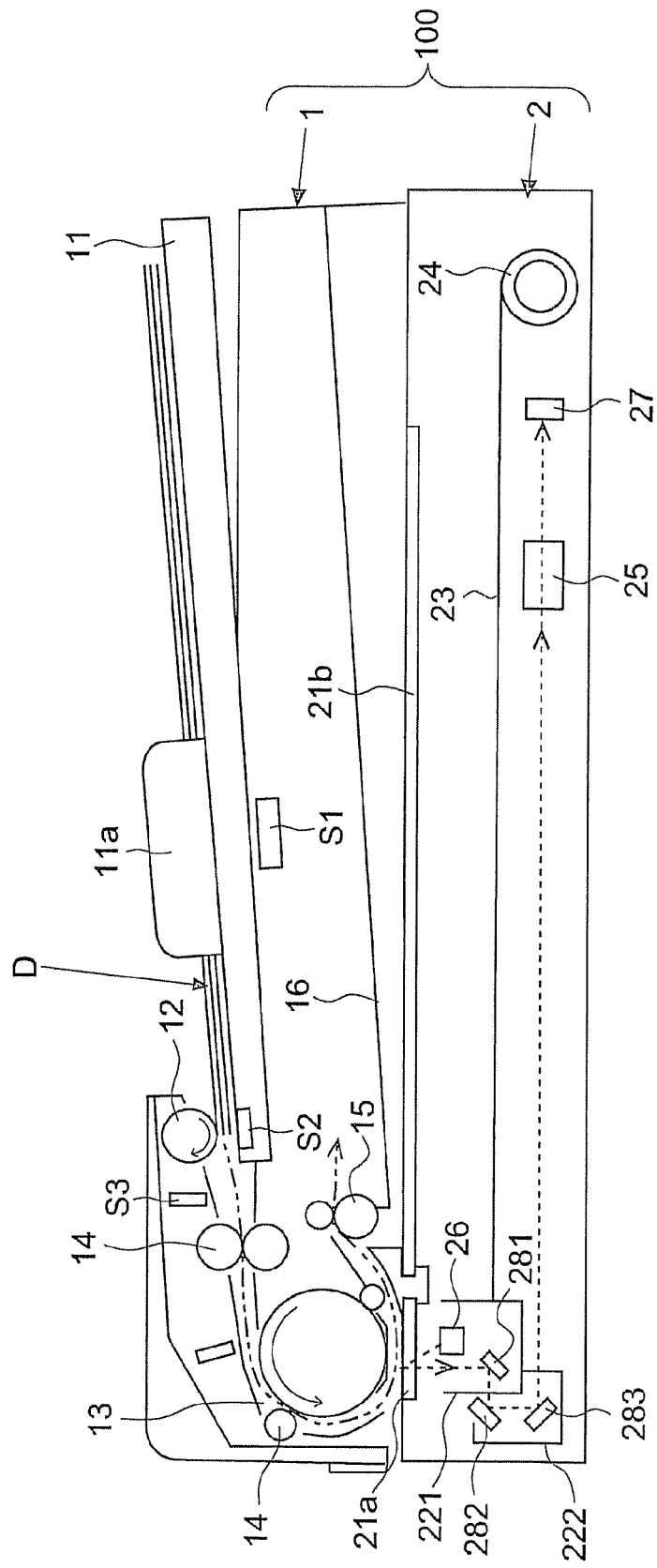
FIG. 2 is a diagram showing an image reading apparatus.

Next, an example of the image reading apparatus 10 according to the embodiment will be described using FIG. 2. FIG. 2 is a diagram showing the image reading apparatus 10.

Firstly, the document conveying section 1 conveys the document Oto be scanned, doing so one page at a time, automatically and continuously to a scanning location (contact glass 21a for fed scanning, discussed layer). The document conveying section 1 includes, in order from the upstream side in the document conveyance direction, a document tray 11, a document supply roller 12 (corresponding to the rotating element for document conveying), a document conveyance path 13, a plurality of document conveying roller pairs 14 (corresponding to the rotating elements for document conveying), a document discharge roller pair 15 (corresponding to the rotating element for document conveying), and a document discharge tray 16. The document conveying section 1 is attached to the image scanning section 2 at a pivot point situated at the back in the plane of page in FIG. 2, so that the near side thereof opens and closes in a vertical direction. In so doing, the document conveying section 1 functions at a cover for pressing down onto contact glass of the image scanning section 2.

The document D of multiple pages to be scanned is loaded into the document tray 11. The document tray 11 is furnished with a regulating guide 11a adapted to slide in a width direction (the main scanning direction, a direction orthogonal to the plane of the page in FIG. 2) for regulating the document D.

When an input to perform a document scan is input to the multifunctional peripheral 100, for example, by pressing the start key 34, the document supply roller 12 repeatedly rotates and stops, to send the document D to the document conveyance path 13 one page at a time, with constant spacing furnished between pages.

The sent document D, fed while guided by the plurality of conveying rollers 14 and a guide, passes over the top face of the contact glass 21a for fed scanning. The image scanning section 2 performs scanning during this passage. The document D, once completely scanned, is discharged into the document discharge tray 16 by the document discharge roller pair 15 (the document conveying path is illustrated by the double-dot and dash line). Rotation of the aforedescribed rotating elements (the document supply roller 12, the document conveying roller pairs 14, and the document discharge roller pair 15) [is driven by] a first stepper motor 81 as the drive source (see FIG. 4).

Next, the image scanning section 2 will be described. As shown in FIG. 1 and FIG. 2, the image scanning section 2 has a housing of box shape. The contact glass 21a for fed scanning, which has the form of a transparent panel, is arranged at the left side of the top face of the image scanning section 2. A contact glass 21b for stationary scanning having the form of a transparent panel is arranged at the right side of the top face of the image scanning section 2. With the document conveying section 1 raised and the face to be scanned facing down, the document D (for example, a book) can be positioned on the contact glass 21b for stationary scanning.

As shown in FIG. 2, within the housing of the image scanning section 2 are arranged a first moving frame 221, a second moving frame 222, wires 23, a winding drum 24, a lens 25, a light source section 26 for illuminating the document D with light, an image sensor 27 for receiving light illuminating the document D, and scanning the document D to generate image data, and the like. The light source section 26 includes a lamp (for example, LEDs or a cold cathode tube) extending in the main scanning direction, for providing illuminating light. The image sensor 27 includes a CCD (charge coupled device) in which photoelectric conversion elements are arrayed in lines in the main scanning direction, and scans each line of the document D, based on the reflected light from the document D (a CIS system image sensor would also be acceptable).

The light emitted from the light source section 26 strikes the document D. A first mirror 281, a second mirror 282, and a third mirror 283 direct the reflected light from the document D onto the lens 25. The lens 25 collects the reflected light, which falls on the image sensor 27. In this way, the first mirror 281, the second mirror 282, the third mirror 283, and the lens 25 are optical members for directing the reflected light from the document D onto the image sensor 27. The image sensor 27 converts the reflected light to analog electrical signals according to the image density. Scanning is performed in line units in the main scanning direction (the direction perpendicular to the document conveyance direction), while repeatedly performing scans in succession in the sub-scanning direction (the document conveyance direction), to scan a single page of the document D.

The first moving frame 221 supports the light source section 26 and the first mirror 281. The second moving frame 222 supports the second mirror 282 and the third mirror 283. The first moving frame 221 is arranged above the second moving frame 222. The plurality of wires 23 are attached to the first moving frame 221 and the second moving frame 222 (for convenience, only one is shown in FIG. 2). The wires 23 are connected at their other end to the winding drum 24. The winding drum 24 is driven by a second stepper motor 82 as the drive source (see FIG. 4) in forward and reverse directions. In so doing, the first moving frame 221 and the second moving frame 222 are capable of moving in a horizontal direction (the left-right direction of the image reading apparatus 10), moving the location illuminated by the light source section 26. Consequently, the first moving frame 221, the second moving frame 222, the wires 23, the winding drum 24, and the like function as a moving section for moving the location illuminated by the light source section 26.

During fed scanning of the document D, after driving by the second stepper motor 82, the first moving frame 221 and the second moving frame 222 are secured at a location above the contact glass 21a for fed scanning (the scanning location). The document D passing thereover is then illuminated with light by the light source section 26. On the other hand, when the document D is scanned while placed on the contact glass 21b for stationary scanning, the first moving frame 221 and the second moving frame 222 are prompted to move horizontally in the rightward direction from the home position, by the wires 23 and the winding drum 24. In this way, a document image is converted to electrical signals.

(Hardware Configuration of Multifunctional Peripheral 100)

Figure 3:
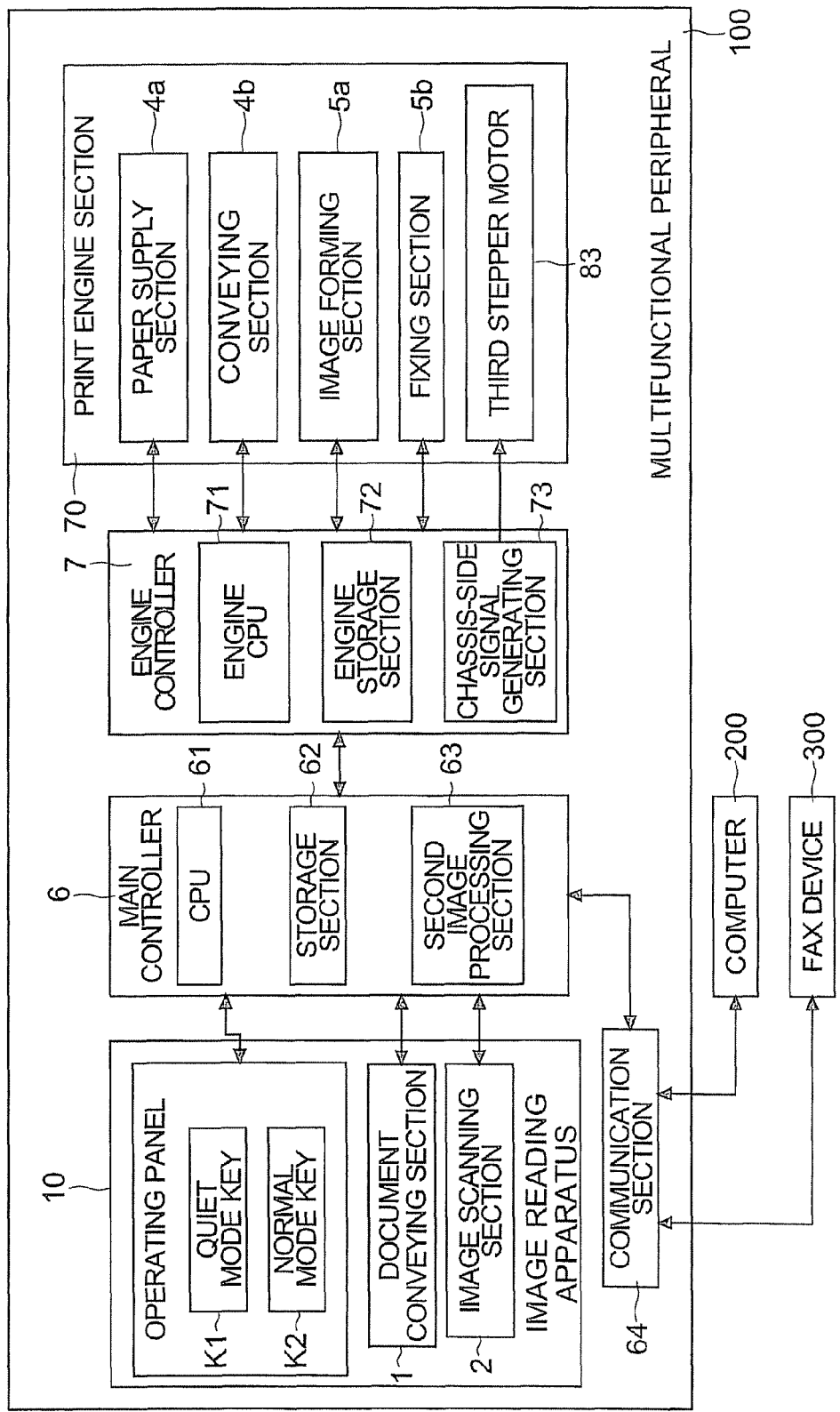
FIG. 3 is a block diagram showing an example of the hardware configuration of a multifunctional peripheral.

Next, an example of the hardware configuration of the multifunctional peripheral 100 according to the present disclosure will be described based on FIG. 3. FIG. 3 is a block diagram showing an example of the hardware configuration of the multifunctional peripheral 100.

Firstly, a main controller 6 for controlling operations by the multifunctional peripheral 100 is furnished inside the multifunctional peripheral 100. The main controller 6 includes a CPU 61, as a component for performing control. The main controller 6 is responsible for the overall control of the multifunctional peripheral 100. For example, the main controller 6 is furnished with a block for performing overall control, a block for performing control of communication, and a block for performing image processing.

The main controller 6 includes a storage section 62. The storage section 62 stores programs and data for controlling the multifunctional peripheral 100, as well as image data and the like. The storage section 62 is a combination of volatile such as RAM and non-volatile storage devices such as ROM, HDD, flash ROM, and the like. On the basis of programs and data stored in the storage section 62, the CPU 61 performs arithmetic processes and sending/receiving of control signals, and performs control of the multifunctional peripheral 100.

The main controller 6 is additionally furnished with a second image processing section 63 for performing image processing of image data that has been processed by the first image processing section 9 (discussed in detail below). The second image processing section 63 performs image processing of data generated by the image reading apparatus 10, and generates image data for printing and transmission purposes. For example, the second image processing section 63 is constituted by an ASIC, memory, and the like, and performs image processing of various kinds, such as density conversion, enlargement/reduction, rotation, compression/decompression data format conversion, and the like.

The device is also furnished with an engine controller 7 that, in the course of performing image formation and paper conveying (feeding), controls operations and processes relating to printing, such as on/off control of the motors that rotate the various rotating elements and the like; paper supply, paper conveying; toner image formation, and the like. The engine controller 7 receives instructions relating to printing (such as content to be printed, number of pages to be printed, and the like) from the main controller 6. On the basis of instructions from the main controller 6, the engine controller 7 performs actual control of a print engine section 70 that includes the paper supply section 4a, the conveying section 4b, the image forming section 5a, the fixing section 5b. The engine controller 7 includes an engine CPU 71, as the arithmetic processing unit; and an engine storage section 72. The engine storage section 72 stores programs and data for controlling the various portions included in the print engine section 70.

The main controller 6 is connected to the document conveying section 1 and the image scanning section 2, and prompts the document conveying section 1 and the image scanning section 2 to perform scanning of the document D and generate image data. The main controller 6 is also connected to the operating panel 3. In so doing, the content of a setting or input made from the operating panel 3 is transmitted to the main controller 6. The main controller 6 controls the various components included in the multifunctional peripheral 100, by issuing instructions such that the components included in the multifunctional peripheral 100 operate in accordance with the content of settings.

The main controller 6 is further connected to a communication section 64. The communication section 64 communicates with a computer 200 (for example, a PC or server) and a fax device 300 through a network, cables, or a communication network. In so doing, the multifunctional peripheral 100 is able to receive and print image data or the like from the computer 200 (printer function), and to accumulate image data scanned by the image scanning section 2 in the storage section 62, or transfer the data to the computer 200 (scan function). The device can also send and receive data to and from the fax device 300 (fax function).

(Hardware Configuration of Image Reading Apparatus 10)

Figure 4:
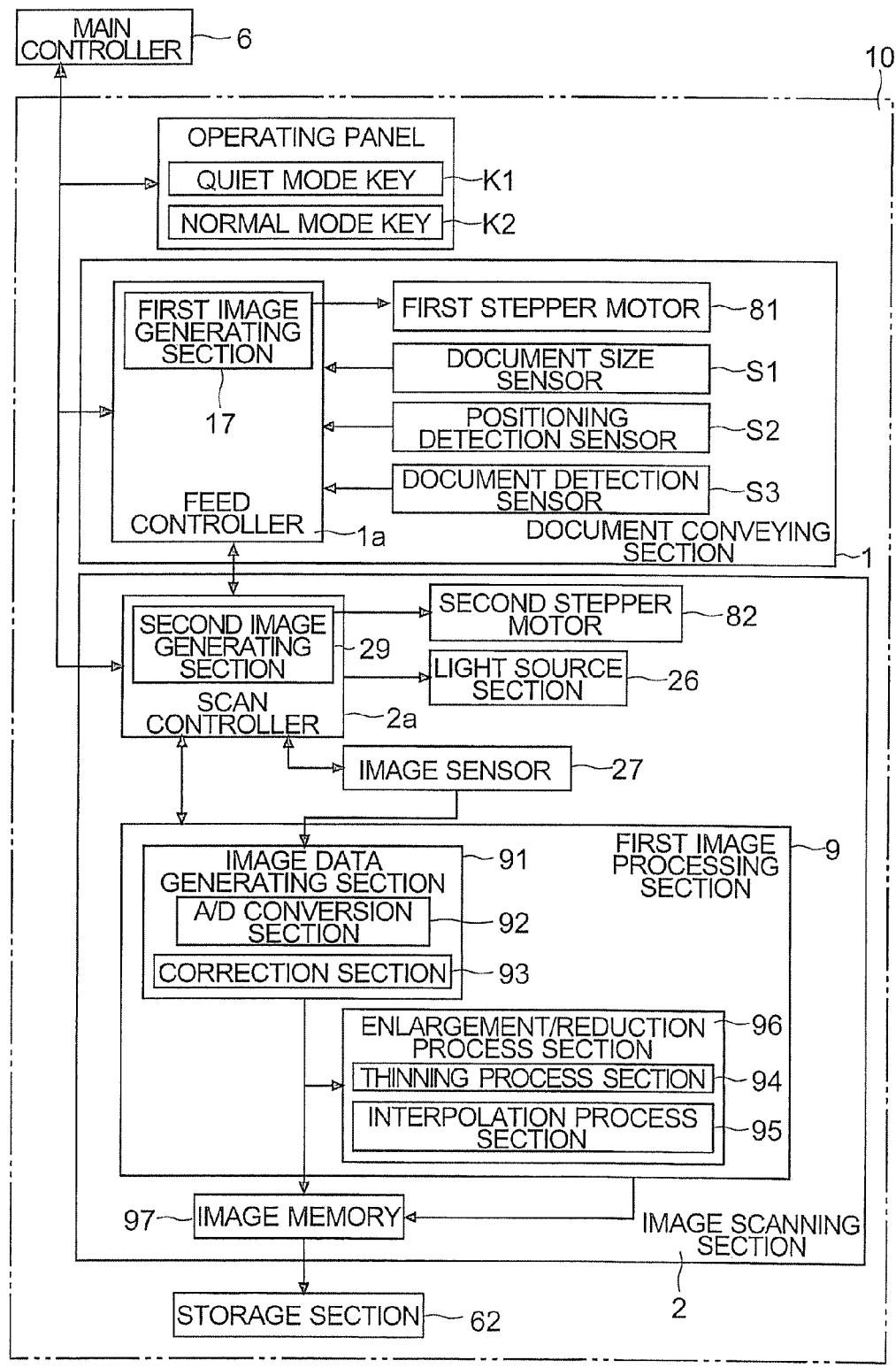
FIG. 4 is a block diagram showing an example of the configuration of an image reading apparatus.

Next, an example of the hardware configuration of the image reading apparatus 10 according to the embodiment will be described using FIG. 4. FIG. 4 is a block diagram showing an example of the configuration of the image reading apparatus 10.

The image reading apparatus 10 of the present embodiment includes the document conveying section 1 and the image scanning section 2. The document conveying section 1 is furnished with a conveying controller 1a for performing control of operations by the document conveying section 1. Meanwhile, the image scanning section 2 is furnished with a scan controller 2a for performing control of operations by the image scanning section 2.

Firstly, the conveying controller 1a is connected to the main controller 6 and the scan controller 2a and is capable of communication therewith. The conveying controller 1a receives instructions or signals from the main controller 6 and the scan controller 2a, and performs operational control of the document conveying section 1. The conveying controller 1a includes a CPU as a central arithmetic processing unit, and ROM, RAM, or the like as storage devices for storing programs and data for control purposes. The document conveying controller 1a communicates with [components] such as the main controller 6, receives instructions [components] such as the main controller 6, and performs operational control of the document conveying section 1.

Additionally, the conveying controller 1a, on the basis of the output of a document size sensor S1 furnished to the document conveying section 1 (see FIG. 2), recognizes the size, in the main scanning direction, of the document D which has been loaded into the document tray 11. The document size sensor S1 includes a variable resistor, the resistance of which changes according to the location of the regulating guide 11a; and may be constituted by a sensor, the output value of which changes in concert with the location of the regulating guide 11a. Alternatively, a plurality of optical sensors for detecting the presence or absence of paper may be lined up in the main scanning direction.

In the present description, the main scanning direction refers to the direction of the scan lines of the image sensor 27 (the direction in which the photoreceptor elements are arrayed), i.e., a direction perpendicular to the document D conveying direction and the direction of movement of the light source section 26. In the present embodiment, the front-back direction of the multifunctional peripheral 100 is the main scanning direction. The sub-scanning direction, on the other hand, is a direction perpendicular to the main scanning direction of the image sensor 27 (the direction in which the photoreceptor elements are arrayed), i.e., the document D conveying direction and the direction of movement of the light source section 26. In the present embodiment, the left-right direction of the multifunctional peripheral 100 is the sub-scanning direction.

On the basis of the output of a positioning detection sensor S2 furnished to the document conveying section 1 (see FIG. 2), the conveying controller 1a recognizes whether or not the document D has been loaded into the document tray 11. The positioning detection sensor S2 is sensor, the output value of which changes depending on whether or not the document D has been loaded into the document tray 11.

When an instruction to scan the document D has been issued by the main controller 6, in the event that a document is detected to be positioned in the document tray 11, the conveying controller 1a drives the first stepper motor 81 to rotate the document supply roller 12, the document conveying roller pair 14, and so on. In so doing, the document D is fed towards the scanning location (the contact glass 21a for fed scanning).

The first stepper motor 81 receives input of a pulse signal, and rotates at a speed in accordance with the frequency of the pulse signal. As shown in FIG. 4, the conveying controller 1a includes a first signal generating section 17 for generating a pulse signal to be input to the first stepper motor 81. The first signal generating section 17 generates a pulse signal (clock signal) that is supplied to the first stepper motor 81. The first signal generating section 17 can also change the frequency of the pulse signal. By changing the frequency of the pulse signal, the conveying controller 1a (the first signal generating section 17) is able to change the rotation speed of the first stepper motor 81 (the speed at which the document D is fed).

The document conveyance path 13 [leading] from the document supply roller 12 to the contact glass 21a for fed scanning is furnished with a document detection sensor S3 (see FIG. 2) for detecting the arrival and passage of the document D. On the basis of the output of the document detection sensor S3, the conveying controller 1a recognizes the presence or absence of the document D at the installation location (point) of the document detection sensor S3, and the arrival and passage of the document D. The document detection sensor S3 is a sensor, the output value of which changes depending on whether or not the document D is present.

The length, in the sub-scanning direction, of the document D loaded into the document tray 11 (the document D which is to be scanned) is calculated by multiplying the speed at which the document D is conveyed (fed) (the peripheral speed of the document conveying roller pair 14), and the duration from detection of arrival of the document until detection of passage of the document by the document detection sensor S3. The conveying controller 1a gauges the duration from detection of arrival of the document until detection of passage of the document, and calculates the length (size) of the document D in the sub-scanning direction, from the document conveying speed calculated on the basis of the rotation speed of the first stepper motor 81.

Next, the image scanning section 2 will be described. Firstly, the scan controller 2a is connected to the main controller 6 and the conveying controller 1a discussed above, and is capable of communication therewith. The scan controller 2a receives instructions or signals from the main controller 6, and performs operational control each section in the image scanning section 2. The scan controller 2a includes a CPU as a central arithmetic processing unit, and ROM and RAM as storage devices for storing programs and data necessary for control of the image reading apparatus 10.

Upon receiving from the main controller 6, in response to operation of the start key 34 of the operating panel 3 or the like, an instruction to scan the document D, the scan controller 2a performs operational control of the image scanning section 2, as well as control of transmission of scanned image data to the storage section 62 (the main controller 6), and the like.

The second stepper motor 82 is connected to the scan controller 2a. In so doing, the scan controller 2a controls rotation of the second stepper motor 82 to rotate the winding drum 24 and move the moving frames. The conveying controller 1a notifies the scan controller 2a that the document D is loaded into the document tray 11, or that the document D is absent. To scan the document D when the document D has been loaded into the document tray 11, the scan controller 2a moves the moving frames to below the contact glass 21a for fed scanning. On the other hand, to scan the document D when the document D has not been loaded into the document tray 11, the scan controller 2a rotates the winding drum 24, moving the illumination location of the light source section 26 in the sub-scanning direction, and scanning the document D on the contact glass 21b for stationary scanning.

The second stepper motor 82 receives input of a pulse signal, and rotates at a speed in accordance with the frequency of the pulse signal. As shown in FIG. 4, the scan controller 2a includes a second generating section 29 for generating a pulse signal to be input to the second stepper motor 82. The second signal generating section 29 generates a pulse signal as a clock signal that is supplied to the second stepper motor 82. The second signal generating section 29 can also change the frequency of the pulse signal. By changing the frequency of the pulse signal in this way, the scan controller 2a (the second signal generating section 29) is able to change the rotation speed of the second stepper motor 82. The specifications of the second stepper motor 82 may be the same as the first stepper motor 81, or different.

The scan controller 2a also controls turning on and off of the light source section 26. When the document D is scanned, the scan controller 2a turns on the light source section 26. The scan controller 2a controls the driving (operation) of the image sensor 27. When the document D is scanned, the scan controller 2a operates the image sensor 27. The scan controller 2a is connected to the first image processing section 9, and controls the operation of the first image processing section 9.

The first image processing section 9 generates image data on the basis of the output of the image sensor 27, and carries out image processing of the image data so generated. In the present embodiment, an example in which the first image processing section 9 is furnished to the image scanning section 2, and the second image processing section 63 to the main controller, 6 is described. However, it would be acceptable to furnish a single image processing section only, and to have the processes of the first image processing section 9 and the processes of the second image processing section 63 performed by the single furnished image processing section.

The image sensor 27 of the multifunctional peripheral 100 of the present embodiment is a sensor that includes a plurality of photoreceptor elements arrayed in lines. The image sensor 27 receives light illuminating the document D, and outputs three analog electrical signals, RGB, for each pixel. For this reason, the image sensor 27 of the multifunctional peripheral 100 of the present embodiment includes line sensors for each of the respective colors RGB.

The photoreceptor elements of the image sensor 27 (the line sensors) accumulate charge commensurate with the quantity of light received. Then, at a constant cycle, the scan controller 2a outputs the accumulated charges from the photoreceptor elements of the image sensor 27, as electrical signals (analog signals). The magnitude of the signal values of the signals outputted by the pixels differ according to the quantity of light received during the cycle.

The first image processing section 9 includes an image data generating section 91 for generating image data on the basis of the analog outputs of the image sensor 27. The image data generating section 91 includes an A/D conversion section 92 for quantization of the analog electrical signals of the pixels to convert these to digital signals, and generate image data, and a correction section 93. The A/D conversion section 92, for example, quantizes the RGB pixels over 8 to 10 bits (for a total of 24 to 30 bits). The first image processing section 9 generates luminance data (black and white data) for each pixel from the RGB data.

The correction section 93 performs correction of the analog signals from the image sensor 27, and the generated image data. The correction section 93 performs gamma correction, shading correction, and other such correction of distortions stemming from the components of the image scanning section 2, such as the characteristics of the light source section 26 or the image sensor 27.

The first image processing section 9 includes an enlarging/reducing process section 96 having a thinning process section 94 for performing a process of thinning pixels or lines, and an interpolation process section 95 for performing a process to interpolate pixels or lines, according to a set resolution for scanning. Through processing by the enlarging/reducing process section 96, image data is generated at the resolution instructed by the user.

The image data generated and processed by the first image processing section 9 is accumulated in an image memory 97. The image memory 97 transfers the image data, in page units or in band (strip-shaped areas resulting from multiple division of one page along lines in the main scanning direction) units, in successive fashion to the storage section 62 (the main controller 6). The second image processing section 63 carries out the necessary image processing for the job, on the image data accumulated in the storage section 62. The processed image data is then used for printing, transmission, or the like.

(Scanning in Normal Mode)

Next, scanning in the normal mode is described using FIG. 4 and FIG. 5. FIG. 5 is a diagram describing scanning in the normal mode.

Firstly, in the image reading apparatus 10 of the present embodiment, it can be selected whether to perform scanning in normal mode, or to perform scanning in quiet mode. Stated another way, multiple scanning modes are available in the image reading apparatus 10 of the present embodiment. Specifically, as shown in FIG. 4, the operating panel 3 is furnished with a quiet mode key K1 for selecting scanning in the quiet mode, and a normal mode key K2 for selecting scanning in the normal mode. The quiet mode is a mode for suppressing noise arising during scanning, to a greater extent than during normal mode (discussed in detail below). The user can select and set the scanning mode by touching these two keys which have been furnished on the operating panel 3.

In response to pressing of a key on the operating panel 3, information about the selected mode is transmitted to the main controller 6, the scan controller 2a, and the conveying controller 1a. In so doing, the scan controller 2a and the conveying controller 1a control the operations of the components inside the image reading apparatus 10, so that scanning takes place in the selected mode (discussed in detail below).

Scanning in the normal mode will be described first. The normal mode is a mode in which the frequency of the pulse signal input to the stepper motors is changed in accordance with the enlargement factor for scanning (an enlargement factor exceeding actual size). The normal mode is mode which satisfies a [specific] number of scanned pages per unit of time, according to the specifications [for the device]. The operating panel 3 accepts input by the user, to set an enlargement factor for scanning. The scan controller 2a and the conveying controller 1a control the rotation speed of the first stepper motor 81 and the second stepper motor 82 in such a way that scanning of the document D is performed at the set enlargement factor.

The image sensor 27 outputs analog signals in a constant cycle. Therefore, the quantity of lines scanned in the sub-scanning direction during scanning of a single page changes depending on the speed of movement of the document D, and the speed of movement of the illumination location of the light source section 26.

As shown in FIG. 5, in the normal mode, when the document D is fed and scanned at an enlargement factor of 100% (actual size), the conveying controller 1a inputs a pulse signal of frequency fa (a reference pulse signal) to the first stepper motor 81. Also, during the normal mode, when scanning is performed of the document D while stationary on the contact glass 21b for stationary scanning, the scan controller 2a inputs a pulse signal of frequency fb (a reference pulse signal) to the second stepper motor 82.

In the description of the present embodiment, there is described an example in which, when the document D is scanned at a given identical enlargement factor, the frequencies of the pulse signals that should be input to the first stepper motor 81 and the second stepper motor 82 (when performing scanning of a document D while being fed, versus when scanning a stationary document stationed on the contact glass 21b for stationary scanning) differ from one another. Stated another way, there is described an instance in which, when pulse signals of identical frequency are input to the first stepper motor 81 and the second stepper motor 82, the speed at which the document D is fed and the speed at which the illumination location of the light source section 26 differ from one another. Through adjustment of the gear ratio of the gears for transmitting driving of the stepper motors, through employment of identical stepper motors as the first stepper motor 81 and the second stepper motor 82, or through scanning of the document D at identical enlargement factors in the event that input signals of identical frequency are input, the frequency of the pulse signal input to the first stepper motor 81 and the frequency of the pulse signal input to the second stepper motor 82 may be identical (fa=fb), for identical enlargement factors.

The frequency fa of the pulse signal of the first stepper motor 81 is a pulse signal frequency affording a document conveying speed such that the scan width of a single line in the sub-scanning direction (the scan width in one cycle of output by the image sensor 27) coincides with a width equal to a single pixel in the sub-scanning direction, at [a specified] scanning resolution (for example, in the case of 600 dpi, single pixel width is approximately 0.042 mm).

The frequency fb of the pulse signal of the second stepper motor 82 is a pulse signal frequency such that the scan width of a single line in the sub-scanning direction coincides with a width equal to a single pixel, at the specified scanning resolution.

In the main scanning direction, the scan width per single pixel cannot be changed, even when the conveying speed of the document D and the moving speed of the optical section 26 are changed. For this reason, the enlargement factor of the lens 25 and the size of the image sensor 27 will be set such that a scan width equal to a single photoreceptor element in the main scanning direction, and a width equal to a single pixel at the specified scanning resolution in the main scanning direction, are the same. Stated another way, in the main scanning direction, [scanning] is always actual size scanning. As shown in FIG. 5, in actual size scanning, there is no need for image processing to increase or decrease the quantity of lines or pixels, in either the sub-scanning direction or the main scanning direction. Consequently, during actual size scanning, which is most frequently employed when scanning, the first image processing section 9 does not perform a thinning or interpolation process.

In the normal mode, when the document D is fed and scanned at a reduction factor (an enlargement factor smaller than actual size), the conveying controller 1a inputs a pulse signal of the frequency fa to the first stepper motor 81. Stated another way, the conveying controller 1a prompts the first stepper motor 81 to rotate in such a way that the document conveying speed is the same as that during actual-size scanning.

Moreover, in the normal mode, when the document D is scanned at a reduction factor (an enlargement factor smaller than actual size) while stationed on the contact glass 21b for stationary scanning, the scan controller 2a inputs a pulse signal of the frequency fb to the second stepper motor 82. Stated another way, the scan controller 2a prompts the second stepper motor 82 to rotate such that the speed at which the illumination location of the light source section 26 moves (the speed at which the first moving frame 221 moves, the speed at which the scanning location moves) is the same as that during actual-size scanning.

As shown in FIG. 5, during scanning at a reduction factor, the first image processing section 9 performs a thinning process in both the sub-scanning direction and the main scanning direction. Specifically, at a 50% enlargement factor, lines and pixels are thinned at a rate of 50 lines (pixels) per 100 lines (pixels) in the sub-scanning direction and in the main scanning direction, to decrease the quantity of lines (number of pixels) in the sub-scanning direction and the quantity of lines (number of pixels) in the main scanning direction. Stated another way, the first image processing section 9 performs a thinning process to give a quantity of lines such that the quantity of lines in the sub-scanning direction and the main scanning direction of the image data subsequent to the thinning process is equal to the quantity of lines in the sub-scanning direction and the main scanning direction of the image data prior to the thinning process, multiplied by the reduction factor.

On other hand, in the normal mode, when scanning is performed by document conveying at an enlarging factor (an enlargement factor greater than actual size), the conveying controller 1a inputs to the first stepper motor 81 a pulse signal of a frequency lower than the frequency fa, in accordance with the enlargement factor. Stated another way, the conveying controller 1a prompts the first stepper motor 81 to rotate such that the document conveying speed is slower than that during actual-size scanning.

Specifically, the conveying controller 1a generates a pulse signal of a frequency fx obtained by dividing the frequency fa for actual size by a set enlarging factor, and inputs the signal to the first stepper motor 81. For example, in the case of a 200% enlargement factor, the conveying controller 1a generates a pulse signal of the frequency fx=fa×(1/2), obtained by dividing the actual-size [scanning] frequency fa by 2, and inputs the signal to the first stepper motor 81. In so doing, the document conveying speed is one-half that during actual-size scanning, and the quantity of lines in the sub-scanning direction obtained during scanning of a single page document D is twice that at actual size (enlargement of 200%).

Moreover, in the normal mode, when the document D is scanned at an enlarging factor (an enlargement factor greater than actual size) while stationed on the contact glass 21b for stationary scanning, the scan controller 2a inputs a pulse signal of a frequency lower than the frequency fb, in accordance with the enlargement factor, to the second stepper motor 82. Stated another way, the conveying controller 1a prompts the second stepper motor 82 to rotate such that the speed of movement of the illumination location of the light source section 26 (the speed of movement of the first moving frame 221, the speed of movement of the scanning location) is slower than that during actual-size scanning.

Specifically, the scan controller 2a generates a pulse signal of a frequency fy obtained by dividing the frequency fb for actual size by a set enlarging factor, and inputs the signal to the second stepper motor 82. For example, in the case of a 150% enlargement factor, the scan controller 2a generates a pulse signal of the frequency fy=fb×(1/1.5), obtained by dividing the frequency fa for actual size by 1.5, and inputs the signal to the second stepper motor 82. In so doing, the speed at which the illumination location of the light source section 26 moves is speed 1/1.5 that during actual-size scanning, and the quantity of lines in the sub-scanning direction obtained during scanning of a single page document D is 1.5 times that at actual size (enlargement of 150%).

As shown in FIG. 5, during scanning at an enlarging factor, the first image processing section 9 performs an interpolation process for the main scanning direction. Specifically, at a 200% enlargement factor, an interpolation process is performed to add 100 lines (100 pixels) for each 100 lines (pixels) in the main scanning direction. Stated another way, the first image processing section 9 performs an interpolation process such that the quantity of lines in the main scanning direction of the image data subsequent to the interpolation process is equal to the quantity of lines in the main scanning direction of the image data prior to the interpolation process, multiplied by the enlarging factor.

The first image processing section 9 makes reference to pixel values of pixels neighboring a location at which [a pixel] is to be added, to determine a pixel value for the additional pixel. For example, the first image processing section 9 takes an average of pixel values of pixels at predetermined locations with respect to a pixel to be added, e.g., neighboring pixels in eight directions about the addition location, neighboring pixels in four directions, two adjacent pixels in the main scanning or sub-scanning direction, or the likely; and designates this average as the pixel value of the added pixel. The aforedescribed interpolation process is merely one example, and pixel values for added pixels could be determined by other methods.

Within the enlarging/reducing process section 96, there is stored predetermined data for determining, in accordance with the enlargement factor, locations for thinning lines (pixels); and, for lines in the main scanning direction, determining, in accordance with the enlargement factor, locations at which to add lines (pixels) (interpolated). The enlarging/reducing process section 96 performs the thinning process or interpolation process on the basis of the data in question.

On the other hand, during scanning at an enlarging factor, scanning is performed at a scanning speed that has been lowered in accordance with the enlargement factor. Image processing to increase or decrease the quantity of lines or pixels is unnecessary in the sub-scanning direction. Consequently, during scanning at an enlarging factor, the first image processing section 9 does not an interpolation process to interpolate a quantity of lines in the sub-scanning direction.

(Flow During Scanning of Document D in the Normal Mode)

Figure 6:
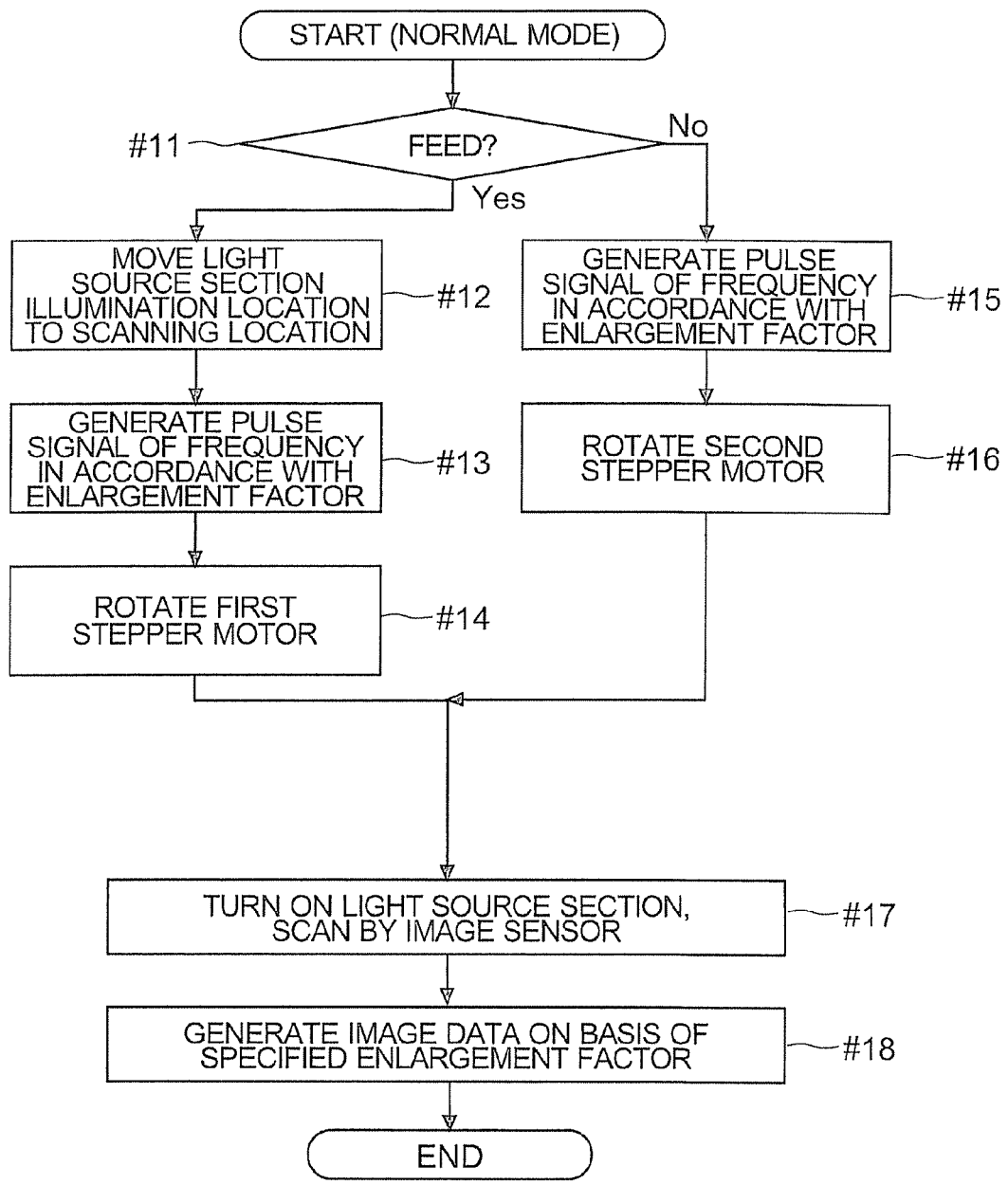
FIG. 6 is a flowchart showing the flow of processing during scanning of a document in normal mode.

Next, using FIG. 6, an example of the flow of processing during scanning of document D in the normal mode will be described. FIG. 6 is a flowchart showing an example of the flow of processing during scanning of the document D in the normal mode.

FIG. 6 starts at the point in time that scanning of the document D is initiated in the normal mode. On the basis of push operation of the start key 34, or input of an instruction to initiate scanning made through from the touch panel 31 by the user, the main controller 6, the conveying controller 1*a*, and the scan controller 2*a* initiate scanning of the document D. Prior to initiating scanning of the document D, the user, via the operating panel 3, [selects] scanning in the normal mode, and set the enlargement factor for scanning, and so on.

When scanning is performed in the normal mode, the conveying controller 1*a* and the scan controller 2*a* verify whether or not the document D is to be scanned while fed (conveyed) (Step #11).

When the document D is to be scanned while fed (Yes in Step #11), the scan controller 2*a* rotates the second stepper motor 82, moving the illumination location of the light source section 26 (the moving frames) to below the contact glass 21*a* for fed scanning (Step #12).

The conveying controller 1*a* then generates a pulse signal of a frequency in accordance with the enlargement factor (Step #13). Stated another way, the conveying controller 1*a* generates a pulse signal of lower frequency, the greater the enlargement factor is with respect to actual size. The conveying controller 1*a* then inputs the generated pulse signal to the first stepper motor 81, prompting the first stepper motor 81 to rotate (Step #14).

On the other hand, when the document D is to be scanned while stationed on the contact glass 21*b* for stationary scanning (No in Step #11), the scan controller 2*a* generates a pulse signal of a frequency in accordance with the enlargement factor (Step #15). Stated another way, the conveying controller 1*a* generates a pulse signal of lower frequency, the greater the enlargement factor is with respect to actual size. The scan controller 2*a* then inputs the generated pulse signal to the second stepper motor 82, prompting the second stepper motor 82 to rotate (Step #16).

In association with document conveying of the document and initiation of movement of the light source section 26 (after Step #14 or Step #16), the scan controller 2*a* turns on the light source section 26, and initiates scanning by the image sensor 27 (Step #17). The first image processing section 9 then performs a thinning process or interpolation process, as needed, and generates image data based on a stipulated enlargement ratio (Step #18). Scanning of the document D is then completed (End). The generated image data is, for example, sent to the storage section 6 for copying, transmission, or other job.

(Scanning in Quiet Mode)

Next, using FIG. 7, scanning in the quiet mode will be described. FIG. 7 is a diagram describing scanning in the quiet mode.

In the first instance, vibration arises when a stepper motor is rotated. The magnitude of vibration based on rotation of the stepper motor differs in accordance with the frequency of the pulse signal. Typically, the more closely the frequency of the pulse signal approximates the characteristic vibration (resonance) frequency of the stepper motor, the case, or fastened portions of the stepper motor, the greater the magnitude of vibration will be. The characteristic vibration frequency is affected by factors such as the shape of the stepper motor case and the method of attachment of the stepper motor (the number of fastening points, the fastening fittings, the locations of the fastening fittings with respect to the frame, and the like).

The greater the magnitude of vibration of the stepper motor is, the louder the noise. As the magnitude of vibration becomes larger, noise known as "chattering noise" may arise. It is therefore necessary to input to the stepper motor a pulse signal of a frequency that will not give rise to vibration such that noise such as chattering noise arises.

However, in the conventional scanning format such as that prevailing in the normal mode, the frequency of the pulse signal (the drive frequency) input to the stepper motor changes in accordance with the enlargement factor. At this time, depending on the enlargement factor, vibration based on rotation of the stepper motor may become greater, and considerable noise may arise during scanning.

Even in cases of a design intended to suppress vibration, modification of the scanning speed, modification of the components used (for example, the stepper motors, the lens 25, and the like), and the like may result in considerable vibration based on rotation of the stepper motor arising, even during frequently-used actual size scanning, so that considerable noise is generated during scanning.

According to the image reading apparatus 10 of the present embodiment, during the quiet mode, irrespective of the enlargement factor that has been set for scanning, a pulse signal of a fixed frequency contained within a predetermined quiet mode frequency band is input to the stepper motor. The quiet mode frequency band is set to a frequency band such that vibration based on rotation of the stepper motor is suppressed, and chattering noise does not arise. Therefore, vibration and driving noise (generated noise) caused by rotation of the stepper motor is suppressed.

Scanning in the quiet mode will be described in specific terms using FIG. 7. In the quiet mode, a pulse signal of a frequency lower than that during actual size scanning in the normal mode are input to the stepper motor. In so doing, during frequently-used actual size scanning, image data in which the quantity of lines in the sub-scanning direction accords with the enlargement factor can be generated simply by performing a thinning process (without performing a process to generate new lines). Consequently, it is acceptable to simply delete information from the digital data based on the output of the image sensor 27, and advantageous to do so from a picture quality standpoint.

Firstly, when the document D is scanned while being fed in the quiet mode, regardless of which enlargement factor [has been selected] for scanning, the frequency f1 of the pulse signal for the first stepper motor 81 is fixed at a frequency included in a frequency band such that the amount of vibration (vibration level) based on rotation of the first stepper motor 81 is equal to or less than a predetermined reference vibration level for the first stepper motor 81. Specifically, in preferred practice, a pulse signal frequency band such that the amount of vibration arising is an amount of vibration one-half to one-third or less, in relation to the maximum amount of vibration arising on the basis of rotation of the first stepper motor 81 in the normal mode, is selected as the quiet mode frequency band for the first stepper motor 81. Stated another way, the conveying controller 1*a* generates a pulse signal of a frequency included in a frequency band (a predetermined quiet mode frequency band) such that the amount of vibration is kept to about one-half to one-third, in relation to the amount of vibration of the first stepper motor 81 in the normal mode (for example, amount of vibration during actual-size [scanning]), and the signal is input to the first stepper motor 81. In so doing, chattering vibration will not arise in the first stepper motor 81, and noise arising during document conveying can be suppressed.

Still more preferably, as the pulse signal of a frequency included in the predetermined quiet mode frequency band for the first stepper motor 81, the conveying controller 1*a* generates a pulse signal of a frequency at which vibration based on rotation of the first stepper motor 81 reaches a minimum, and inputs the signal to the first stepper motor 81.

Additionally, in the quiet mode, during scanning of the document D [while stationed] on the contact glass 21*b* for stationary scanning, the frequency f2 of the pulse signal for the second stepper motor 82 is fixed regardless of which enlargement factor [has been selected] for the scan, and is [set to] a frequency included in a frequency band such that the amount of vibration (vibration level) based on rotation of the second stepper motor 82 is equal to or less than a predetermined reference vibration level for the second stepper motor 82. Specifically, in preferred practice, a pulse signal frequency band such that the amount of vibration arising is an amount of vibration one-half to one-third or less, with respect to the maximum amount of vibration arising on the basis of rotation of the second stepper motor 82 in the normal mode, is selected as the quiet mode frequency band for the second stepper motor 82. Stated another way, the scan controller 2*a* generates a pulse signal of a frequency included in a frequency band (a predetermined quiet mode frequency band) such that the amount of vibration is about one-half to one-third, with respect to the amount of vibration of the second stepper motor 82 in the normal mode (for example, amount of vibration during actual-size [scanning]), and the signal is input to the second stepper motor 82. In so doing, chattering vibration will not arise, and even when the second stepper motor 82 is rotated, noise arising when the light source section 26, the first moving frame 221, and the second moving frame 222 are moved can be suppressed.

Still more preferably, as the pulse signal of a frequency included in the quiet mode frequency band of the second stepper motor 82, the scan controller 2*a* generates a pulse signal of a frequency such that vibration based on rotation of the second stepper motor 82 reaches a minimum, and inputs the signal to the second stepper motor 82.

The quiet mode frequency band of the first stepper motor 81 and the quiet mode frequency band of the second stepper motor 82 may be ranges of different frequencies. In this case, the quiet mode frequency bands may be selected in respective fashion for the stepper motors, and the pulse signals input to the stepper motors after generation of the quiet mode set to these frequencies.

Here, the frequency f1 of the pulse signal of the first stepper motor 81 input in the quiet mode corresponds to the frequency of a pulse signal input to the first stepper motor 81 at some given enlargement factor for enlarged scanning through document conveying while in the normal mode. In FIG. 7, this corresponding enlargement factor is denoted as Z1.

The enlargement factor Z1 represents an enlargement factor at which there is no need for the first image processing section 9 to increase or decrease the quantity of lines (number of pixels) in the sub-scanning direction, in image data obtained when a pulse signal of the frequency f1 is input to the first stepper motor 81. Stated another way, the frequency f1 of the pulse signal for the first stepper motor 81 in the quiet mode corresponds to the frequency of a pulse signal adapted to rotate the first stepper motor 81 such that scanning [takes place] at a line width in the sub-scanning direction [that prevails during scanning] at the enlargement factor Z1 in the normal mode.

Likewise, the frequency f2 of the pulse signal of the second stepper motor 82 input in the quiet mode corresponds to the frequency of a pulse signal input to the second stepper motor 82 at some given enlargement factor for enlarged scanning of the document D while stationed on the contact glass 21*b* for stationary scanning in the normal mode. In FIG. 7, this corresponding enlargement factor is denoted as Z2.

The enlargement factor Z2 represents an enlargement factor at which there is no need for the first image processing section 9 to increase or decrease the quantity of lines (number of pixels) in the sub-scanning direction, in image data obtained when a pulse signal of the frequency f2 is input to the second stepper motor 82. Stated another way, the frequency f2 of the pulse signal for the second stepper motor 82 in the quiet mode corresponds to the frequency of a pulse signal input to the first stepper motor 81 during scanning at the enlargement factor Z2 in the normal mode.

In both the quiet mode and the normal mode, during scanning of the document D on the contact glass 21*b* for stationary scanning, the scan controller 2*a* prompts the second stepper motor 82 to rotate. However, because there is no need for the document to be fed, the first stepper motor 81 does not rotate.

On the other hand, when the document D is scanned while being fed (conveyed), the first stepper motor 81 rotates in both the quiet mode and the normal mode. However, after the illumination location of the light source section 26 and the first moving frame 221 have been moved to below the contact glass 21*a* for fed scanning, the scan controller 2*a* does not prompt the second stepper motor 82 to rotate until completion of scanning. Once scanning is completed, the second stepper motor 82 rotates in order to return the first moving frame 221 to the reference position.

Specifically, as shown in FIG. 7, in the quiet mode, when a scan is performed at the enlargement factor Z1 while conveying the document D, the conveying controller 1*a* inputs to the first stepper motor 81 a pulse signal of the frequency f1 included in the quiet mode frequency range for the first stepper motor 81.

Moreover, in the quiet mode, when a scan is performed at the enlargement factor Z2 with the document D [stationed] on the contact glass 21*b* for stationary scanning, the scan controller 2*a* inputs to the second stepper motor 82 a pulse signal of the frequency f2 included in the quiet mode frequency range for the second stepper motor 82.

With regard to the quantity of lines (number of pixels) in the main scanning direction, when a scan is performed at the enlargement factor Z1 in the quiet mode while conveying the document D, or when a scan is performed at the enlargement factor Z2 in the quiet mode with the document D [stationed] on the contact glass 21*b* for stationary scanning, as shown in FIG. 7, the first image processing section 9 performs an interpolation process to interpolate lines (pixels) in the main scanning direction. For example, when the enlargement factor Z1 or the enlargement factor Z2 is equivalent to a 120% enlargement factor, the first image processing section 9 performs an interpolation process to add pixels at a rate of 20 pixels per 100 pixels within a single line in the main scanning direction. There is no need for the first image processing section 9 to perform image processing to increase or decrease the lines or pixels in the sub-scanning direction. Consequently, during scanning at the enlargement factor Z1 or at the enlargement factor Z2, the first image processing section 9 performs an interpolation process for the main scanning direction, but does not perform a thinning or interpolation process for the sub-scanning direction.

In the quiet mode, when a scan is performed at an enlargement factor smaller than the enlargement factor Z1 (including actual size) while conveying the document D, the conveying controller 1*a* inputs to the first stepper motor 81 a pulse signal of the frequency f1. Stated another way, the conveying controller 1*a* prompts the first stepper motor 81 to rotate such that the document conveying speed is identical to that at the enlargement factor Z1 in the normal mode.

Additionally, in the quiet mode, when a scan is performed at an enlargement factor smaller than the enlargement factor Z2 (including actual size) with the document D [stationed] on the contact glass 21*b* for stationary scanning, the scan controller 2*a* inputs to the second stepper motor 82 a pulse signal of the frequency f2. Stated another way, the scan controller 2*a* prompts the second stepper motor 82 to rotate such that the speed of movement of the light source is identical to that at the enlargement factor Z2 in the normal mode.

Then, as shown in FIG. 7, in the quiet mode, when a scan is performed at an enlargement factor smaller than the enlargement factor Z1 (including actual size) while conveying the document D, or when a scan is performed at an enlargement factor smaller than the enlargement factor Z2 (including actual size) with the document D [stationed] on the contact glass 21b for stationary scanning, because the quantity of lines obtained through the scan will be greater than the quantity of lines needed in the sub-scanning direction, the first image processing section 9 performs a thinning process. Specifically, when the enlargement factor Z1 or Z2 is corresponding to 120% in normal mode, and when a scan is performed at actual size, pixels are thinned at a rate of 20 out of 120 pixels within lines (pixels) in the sub-scanning direction, reducing the quantity of lines (number of pixels) in the sub-scanning direction.

Moreover, with regard to the quantity of lines (number of pixels) in the main scanning direction, as shown in FIG. 7, in the quiet mode, when a scan is performed at an enlargement factor smaller than the enlargement factor Z1 (including actual size) while conveying the document D, or when a scan is performed at an enlargement factor smaller than the enlargement factor Z2 (including actual size) with the document D [stationed] on the contact glass 21b for stationary scanning, depending on the enlargement factor, the first image processing section 9 either performs a thinning process or interpolation process, or does not perform a thinning process or interpolation process. Specifically, with the enlargement factor set to within a range between the enlargement factor Z1 and (actual size +1)%, or within a range between the enlargement factor Z2 and (actual size +1)%, the first image processing section 9 performs an interpolation process to add the required quantity of lines (number of pixels) in the main scanning direction. In the image reading apparatus 10 of the present disclosure, the enlargement factor is settable in increments of 1%. When the enlargement factor is set to actual size, the first image processing section 9 does not perform a thinning process or interpolation process for the main scanning direction. When the enlargement factor is set to smaller than actual size, the first image processing section 9 performs a thinning process for the main scanning direction.

On the other hand, in the quiet mode, when a scan is performed at an enlargement factor greater than the enlargement factor Z1 while conveying the document D, the conveying controller 1a inputs to the first stepper motor 81 a pulse signal of the frequency f1. Stated another way, in the quiet mode, the conveying controller 1a inputs to the first stepper motor 81 a pulse signal of the frequency f1, prompting the first stepper motor 81 to rotate in a state of suppressed vibration.

Moreover, in the quiet mode, when a scan is performed at an enlargement factor greater than the enlargement factor Z2 with the document D [stationed] on the contact glass 21b for stationary scanning, the scan controller 2a inputs to the second stepper motor 82 a pulse signal of the frequency f2. Stated another way, in the quiet mode, the scan controller 2a inputs to the second stepper motor 82 a pulse signal of the frequency f2, prompting the second stepper motor 82 to rotate in a state of suppressed vibration.

Then, as shown in FIG. 7, when a scan is performed at an enlargement factor greater than the enlargement factor Z1 while conveying the document D, or when a scan is performed at an enlargement factor greater than the enlargement factor Z2 with the document D [stationed] on the contact glass 21b for stationary scanning, because the quantity of lines obtained through the scan will be fewer than the quantity of lines needed in the sub-scanning direction, the first image processing section 9 performs an interpolation process.

Moreover, as shown in FIG. 7, when a scan is performed at an enlargement factor greater than the enlargement factor Z1 while conveying the document D, or when a scan is performed at an enlargement factor greater than the enlargement factor Z2 with the document D [stationed] on the contact glass 21b for stationary scanning, the first image processing section 9 performs an interpolation process for the main scanning direction, to add the required quantity of lines (number of pixels) in accordance with the enlargement factor.

In terms of generating image data [having the necessary] quantity of lines (number of pixels) in accordance with the enlargement factor, the process content of the thinning process and the interpolation process is similar to processing taking place in the normal mode as discussed previously. Within the enlarging/reducing process section 96, there is stored predetermined data [indicating] locations for thinning lines (pixels), or locations for adding lines (pixels) by an interpolation process, in accordance with the enlargement factor in the quiet mode. In the quiet mode, the enlarging/reducing process section 96 performs a thinning process or interpolation process on the basis of the data.

(Flow During Scanning of Document D in the Quiet Mode)

Figure 8:
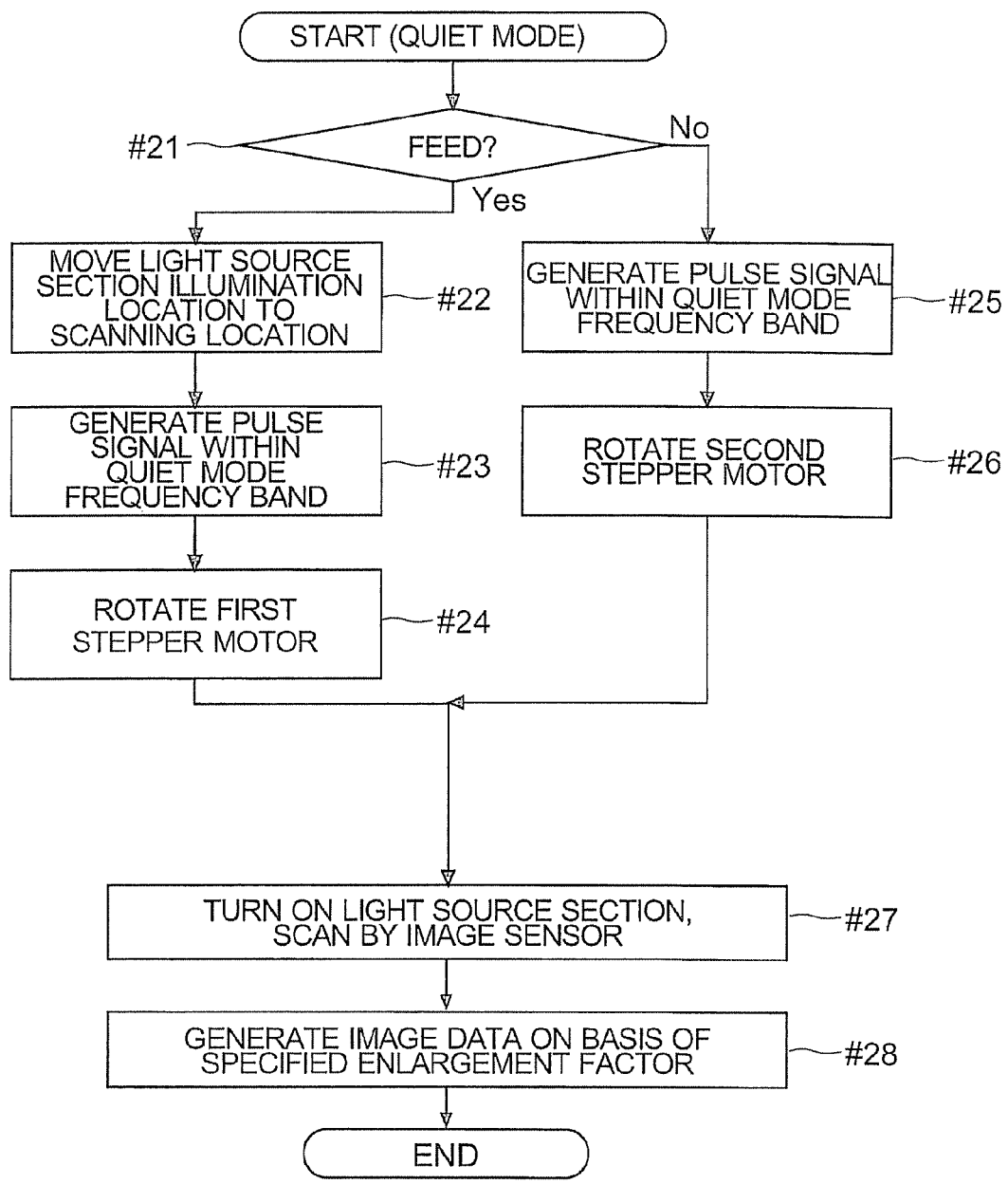
FIG. 8 is a flowchart showing the flow of processing during document scanning in quiet mode.

Next, using FIG. 8, an example of the flow of processing during scanning of document D in the quiet mode will be described. FIG. 8 is a flowchart showing an example of the flow of processing during scanning of the document D in the quiet mode.

FIG. 8 starts at the point in time that scanning of the document D is initiated in the quiet mode. Conditions for initiating a scan of the document D are the same as in the normal mode. Prior to initiating scanning of the document D, setting of the quiet mode and of the enlargement factor for scanning, and so on, by the user, are accepted from the operating panel 3.

When scanning is performed in the quiet mode, the conveying controller 1a and the scan controller 2a verify whether or not the document D is to be scanned while fed (Step #21).

When the document D is to be scanned while conveying the document D (Yes in Step #21), the scan controller 2a rotates the second stepper motor 82, moving the illumination location of the light source section 26 (the moving frames) to below the contact glass 21a for fed scanning (Step #22).

The conveying controller 1a then generates a pulse signal within the predetermined quiet mode frequency band (a pulse signal frequency band such that vibration caused by rotation of the first stepper motor 81 is below the predetermined reference vibration level) (Step #23). Stated another way, the conveying controller 1a, irrespective of the enlargement factor, generates a pulse signal of fixed frequency contained within the predetermined quiet mode frequency band. The conveying controller 1a then rotating elements for printing. Stated another way, the third stepper motor 83 may rotate only a portion of the rotating elements, among the rotating elements for printing.

The third stepper motor 83 receives input of a pulse signal, and rotates at a speed commensurate with the frequency of the pulse signal. As shown in FIG. 3, the engine controller 7 includes a chassis-side signal generating section 73 for generating the pulse signal for input to the third stepper motor 83. The chassis-side signal generating section 73 generates the pulse signal, such as a clock signal, for supply to the third stepper motor 83. The chassis-side signal generating section 73 is able to change the frequency of the pulse signal. By changing the frequency of the pulse signal in this way, the engine controller 7 (the chassis-side signal generating section 73) is able to change the rotation speed of the third stepper motor 83.

In the normal mode, the engine controller 7 (the chassis-side signal generating section 73) rotates the third stepper motor 83 so as to meet specifications as to printing speed, such as 60 pages per minute or the like.

In the normal mode, in order to meet specifications as to the number of pages [printed] per unit of time, the paper conveying speed and the rotation speeds of the rotating elements are sometimes set fairly high. Faster conveying speeds for conveying the paper may in some cases result in more noise when the paper collides with or rubs against a conveying guide on the conveying path, or noise from the gears that transmit drive.

Accordingly, when the quiet mode has been selected, the engine controller 7 slows the printing speed during printing, to a speed slower than that during printing in the normal mode. Specifically, in the quiet mode, the engine controller 7 slows the rotation of the motors, including the third stepper motor 83 which rotates the rotating elements for printing discussed above, down to a speed slower than that in the normal mode. In so doing, the noise arising during printing in the quiet mode is suppressed to lower levels than in the normal mode.

Further, in the normal mode, when the third stepper motor 83 is rotated such that specifications as to printing speed are met, vibration sometimes becomes strong. Due to such strong vibration, the noise arising from the multifunctional peripheral 100 during printing sometimes becomes loud.

Accordingly, in the quiet mode, the engine controller 7 generates a pulse signal of a frequency contained in a quiet mode frequency band which has been predetermined for the third stepper motor 83, such that vibration of the third stepper motor inputs the generated pulse signal to the first stepper motor 81, prompting the first stepper motor 81 to rotate (Step #24).

On the other hand, when the document D is not to be fed, but instead the document D is to be scanned while stationed on the contact glass 21b for stationary scanning (No in Step #21), the scan controller 2a generates a pulse signal within the predetermined quiet mode frequency band for the second stepper motor (a pulse signal frequency such that vibration caused by rotation of the second stepper motor 82 is below the predetermined reference vibration level) (Step #25). Stated another way, the conveying controller 1a generates a pulse signal of lower frequency in association with a greater enlargement factor. The scan controller 2a then inputs the generated pulse signal to the second stepper motor 82, prompting the second stepper motor 82 to rotate (Step #26).

In association with document conveying of the document and initiation of movement by the light source section 26, the scan controller 2a turns on the light source section 26, and initiates scanning by the image sensor 27 (Step #27). The first image processing section 9 then performs a thinning process or interpolation process, as needed, and generates image data based on a stipulated enlargement ratio (Step #28). Scanning of the document D is then completed (End). The generated image data is, for example, sent to the storage section 62 for copying, transmission, or other job.

(Printing During Quiet Mode)

Next, printing during the quiet mode will be described using FIG. 3.

The multifunctional peripheral 100 of the present embodiment is furnished with the print engine section 70, for the purpose of printing based on image data. For the purposes of paper conveying and formation of toner images, the print engine section 70 is furnished with a polygon mirror in an exposure device 53, as well as with the paper supply roller 42, a conveying roller pair 43, a resist roller pair 44, the photosensitive drum 51, the transfer roller 55, the heated roller 57, the pressure roller 58, and other such rotating elements for performing printing (hereinafter designated as "rotating elements for printing") (see FIG. 1). The rotating elements for printing are not limited to the aforedescribed.

The multifunctional peripheral 100 of the present embodiment is furnished with one or a plurality of stepper motors for rotating some or all of the plurality of rotating elements for printing. In the following description, the motor for supplying drive power to rotate the rotating elements for printing is designated as a third stepper motor 83. It would be acceptable to employ a motor other than a stepper motor as the motor for rotating the 83 is at or below a predetermined reference vibration level. The engine controller 7 then inputs the generated pulse signal (the pulse signal of different frequency from that in the normal mode) to the third stepper motor 83.

When a plurality of third stepper motors 83 are provided, there are instances in which, in terms of performing printing in an appropriate fashion, once the rotation speed of one of the third stepper motors 83 has been decided upon, the rotation speed of [one or more] other third stepper motors 83 (the frequency of the pulse signal to be input thereto) is determined as a matter of course. For example, the time required for scanning/exposure of single line increments by the photosensitive drum 51 is determined according to the rotation speed of the stepping motor that rotates the polygon mirror of the exposure device 53, so the rotation speed of the rotating elements for conveying the paper must be decided upon, such that the paper will be moved by a width equivalent to a single line in the sub-scanning direction, during the time interval required for scanning/exposure of a single line increment.

Thus, there are instances in which the amount of vibration cannot be brought to or below the reference vibration level, in all of the third stepper motors 83. At this time, the engine controller 7 generates a pulse signal of a frequency that will bring the amount of vibration of at least one or more of the third stepper motors 83 to or below the reference vibration level, and inputs the signal to the one or more third stepper motors 83. Ideally, the engine controller 7 will generate a pulse signal of a frequency contained within the predetermined quiet mode frequency band relating to the third stepper motors 83, such that the total amount of vibration caused by rotation of the third stepper motors 83, or noise arising on the basis of vibration of the third stepper motors 83, is brought to a minimum, and input the signal to the third stepper motors 83.

EXAMPLE

Figure 9:
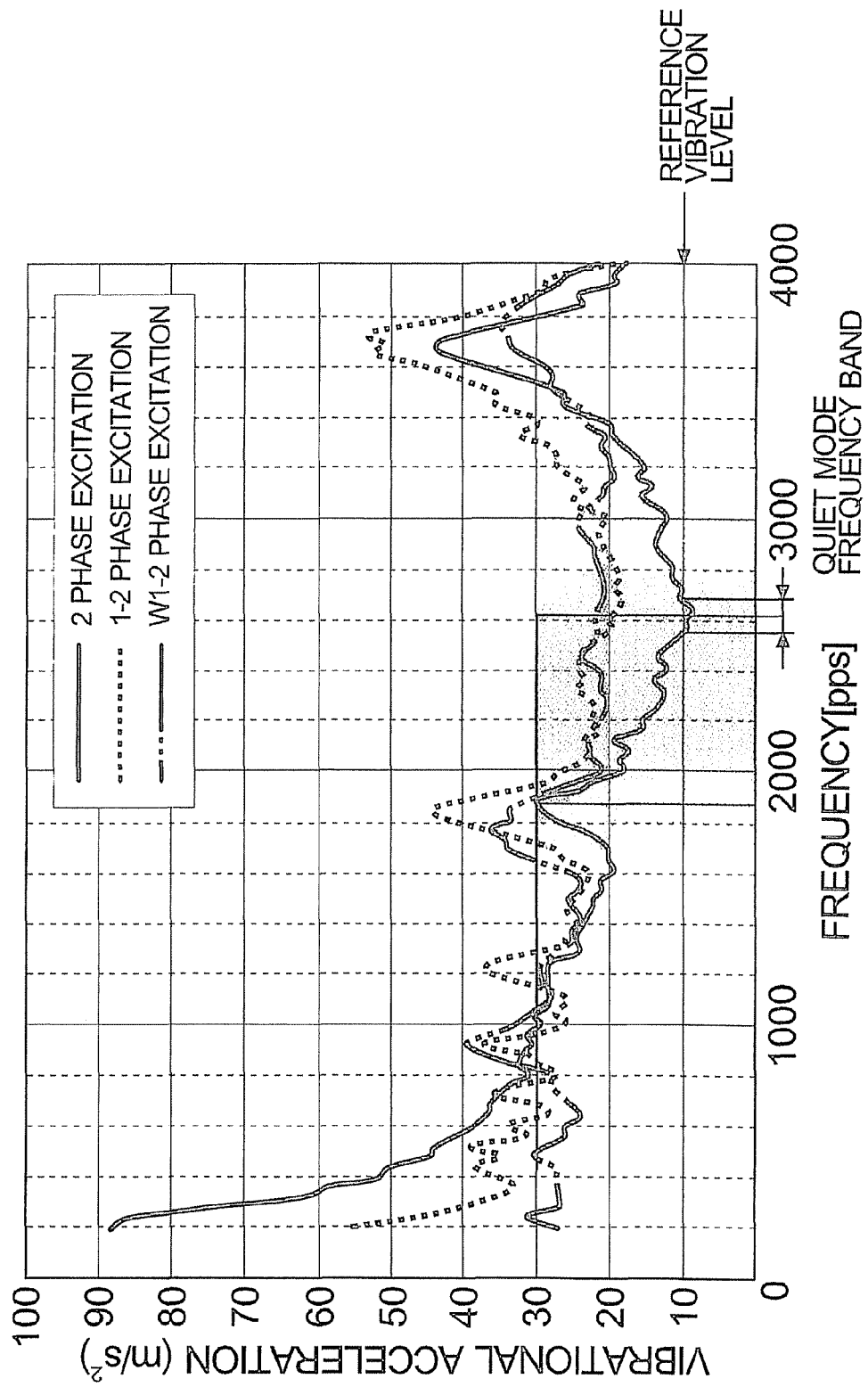
FIG. 9 is a graph showing an example of the relationship between the pulse signal frequency and amounts of vibration during rotation of a first stepper motor to convey a document.

Next, an example of the image reading apparatus 10 according to an embodiment will be described using FIGS. 9 and 10. FIG. 9 is a graph showing an example of the relationship between the pulse signal frequency and amounts of vibration, during rotation of the first stepper motor 81 to conveying the document D. FIG. 10 is a diagram showing an example of pulse signal frequencies input to the first stepper motor 81, and the specifics of image processing, in normal mode and in quiet mode, when performing a scan while conveying the document D.

FIG. 9 will be described first. The horizontal axis in FIG. 9 shows the frequency (pulses per second) of a pulse signal input to the first stepper motor 81. The vertical axis in FIG. 9 shows the vibrational acceleration of the case of the first stepper motor 81. Stated another way, it shows vibrational acceleration of the case of the first stepper motor measured by a measuring instrument. The vibrational acceleration is an indication of the magnitude of vibration, and greater vibrational acceleration correlates with a greater amount of vibration (vibration level) by the first stepper motor 81.

In the present embodiment, the first stepper motor 81 is rotated by two-phase excitation, which readily affords greater torque. In the graph of FIG. 9, the vibrational acceleration [observed] in relation to pulse signal frequency when the first stepper motor 81 is rotated by 2 phase excitation is shown by a solid line. For reference, vibrational acceleration [observed] in relation to pulse signal frequency during 1-2 phase excitation is shown by a broken line, and vibrational acceleration [observed] in relation to pulse signal frequency during W1-2 phase excitation is shown by a double-dotted dashed line.

As shown in FIG. 9, the vibrational acceleration of the first stepper motor 81 changes in accordance with the frequency of the input pulse signal. Stated another way, the magnitude of vibration based on rotation of the stepper motor differs with the frequency of the input pulse signal.

As shown in FIG. 10, in the present embodiment, in the normal mode, when the enlargement factor is equal to or less than actual size (25-100%), the conveying controller 1a generates a 3,400 [pps (Hz)] pulse signal which is input to the first stepper motor 81. In the normal mode, when the enlargement factor exceeds actual size, depending on the enlargement factor, the conveying controller 1a generates a pulse signal of a frequency 17 pps slower, for each 1% increase in the enlargement factor above actual size, and inputs the signal to the first stepper motor 81 (computational formula: 3400−((set enlargement factor×100)−100)×17)). In so doing, when the enlargement factor exceeds 100%, the first stepper motor 81 is rotated such the document D is scanned without performing a line (pixel) interpolation process (by optical zoom) in the sub-scanning direction.

Moreover, as in the present embodiment, in the quiet mode, regardless of the enlargement factor, the conveying controller 1a generates a 2,601 [pps (Hz)] pulse signal which is input to the first stepper motor 81. The 2,601 [pps (Hz)] pulse signal coincides with the frequency of the pulse signal which is input to the first stepper motor 81 when scanning is performed at a 147% enlargement factor (optical zoom) during normal mode. In so doing, in the quiet mode, the first stepper motor 81 can be made to rotate while considerably suppressing the amount of vibration arising therefrom. Consequently, noise such as chattering noise does not arise.

Specifically, as shown in FIG. 9, 2,601 [pps (Hz)] is a frequency belonging to a predetermined quiet mode frequency band in which the amount of vibration is suppressed to one-third the greatest amount of vibration (vibrational acceleration of 30 m/$^2$) occurring in the normal mode. In particular, as shown in FIG. 9, 2,601 [pps (Hz)] can be considered to be a frequency at which the amount of vibration of vibration based on rotation of the first stepper motor 81 in the normal mode is minimized (a frequency at which vibrational acceleration is less than 10 m/$^2$).

Then, as shown in FIG. 10, in the normal mode or in the quiet mode, the first image processing section 9, when generating image data in accordance with the enlargement factor that has been set from the operating panel 3, performs image processing to interpolate lines (pixels) when the quantity of lines in the sub-scanning direction in a scan of the document D is less than the required quantity of lines (in the quiet mode, when the enlargement factor exceeds 147%), or performs image processing to thin the quantity of lines in the sub-scanning direction when the quantity of lines in the sub-scanning direction exceeds the required quantity of lines (in the normal mode, when less than actual size, and in the quiet mode, when the enlargement factor is less than 147%).

Additionally, in both the normal mode and the quiet mode, when the enlargement factor set from the operating panel 3 exceeds 100%, the first image processing section 9 performs image processing to interpolate pixels in the main scanning direction, by the equivalent of the deficit of the quantity of lines (number of pixels) in accordance with the set enlargement factor; and when the enlargement factor set from the operating section is less than 100%, performs image processing to thin the pixels in the main scanning direction, by the equivalent of the surplus of the quantity of lines (number of pixels) in accordance with the set enlargement factor.

In this way, the image reading apparatus 10 according to the present embodiment includes the light source section 26 for illuminating the document D with light; the image sensor 27 for receiving reflected light from the document D, and outputting image signals in single-line units in the main scanning direction; the optical system members (the first mirror 281, the second mirror 282, the third mirror 283, the lens 25) for directing the reflected light from the document D to the image sensor 27; the operating section (the operating panel 3) for accepting input of an enlargement factor at which to scan the document D, and for accepting selection of a scanning mode for the document D, including a normal mode and a quiet mode; the image processing section (first image processing section 9) for generating image data of the document D from pixels in a quantity according to the enlargement factor that was set from the operating section, doing so on the basis of the image signals outputted by the image sensor 27; the stepper motors (the first stepper motor 81 and the second stepper motor 82) for prompting movement by either the document D or the light source section 26, or both; and the signal generating sections (the first signal generating section 17 and the second signal generating section 29) for generating a pulse signal, and inputting the generated pulse signal into the stepper motor, prompting the stepper motor to rotate at a speed in accordance with the frequency of the generated pulse signal; the signal generating sections, during scanning in the quiet mode, generating and inputting to the stepper motor a pulse signal of a frequency contained within a predetermined quiet mode frequency band, irrespective of the enlargement factor, the quiet mode frequency band being a frequency band in which vibration based on rotation of the stepper motor is at or below a predetermined normal vibration level.

In so doing, scanning of the document D can be performed while suppressing the vibration level (magnitude) arising when the stepper motor (the first stepper motor 81 or the second stepper motor 82) is rotated. Then, because vibration based on rotation of the stepper motor can be suppressed, noise generated due to vibration during scanning of the document D can be suppressed. Consequently, a quiet image reading apparatus 10 can be provided. Moreover, there is no need to employ expensive stepper motors of low-vibration type, or to provide additional vibration-damping members, in order to suppress vibration or noise due to vibration, as in the past. Consequently, the manufacturing cost of the image reading apparatus 10 does not increase, and both vibration arising during scanning of the document D, and generated noise caused by vibration, can be suppressed.

Additionally, the signal generating section (the first signal generating section 17 or the second signal generating section 29), when a selection has been made from the operating section to scan the document D in the quiet mode, generates and inputs to the stepper motor (the first stepper motor 81 or the second stepper motor 82) a pulse signal of a frequency contained within the quiet mode frequency band; or when a selection has been made from the operating section to scan the document D in the normal mode, generates and inputs to the stepper motor a pulse signal of a frequency at which the document D is scanned in the sub-scanning direction in lines in a quantity according to the enlargement factor set from the operating section. In so doing, when the quiet mode has been selected, scanning of the document D can be performed while suppressing vibration and generated noise caused by rotation of the stepper motor. Additionally, when the normal mode has been selected, the document D and/or the light source section 26 can be moved such that scanning is performed at a line width in the sub-scanning direction, in accordance with the enlargement factor, and scanning can be performed with an emphasis on image quality.

Moreover, the image reading apparatus 10 of the present embodiment includes the document conveying section 1 for conveying the loaded document D one page at a time towards the scanning location (the contact glass 21a for fed scanning) for illumination with light by the light source section 26, the stepper motor being the first stepper motor 81 included in the document conveying section 1, for conveying the document D; document-conveyance rotating elements for conveying the document D being caused to rotate by the first stepper motor 81. In so doing, vibration arising when the first stepper motor 81 is rotated for the purpose of conveying the document, and generated noise based on vibration, can be suppressed.

Additionally, the image reading apparatus 10 of the present embodiment includes the moving section (the first moving frame 221, the second moving frame 222, the winding drum 24, and the wires) for moving the light source section 26, moving the location at which the document D stationed on the contact glass (the contact glass 21b for stationary scanning) is illuminated by light; the stepper motor being the second stepper motor 82 for operating the moving section and moving the light source section 26. In so doing, vibration arising when the second stepper motor 82 is rotated for the purpose of moving the light source section 26 and the like, and generated noise based on vibration, can be suppressed.

Additionally, the image processing section (the first image processing section 9), when generating image data in accordance with the enlargement factor that has been set from the operating section (the operating panel 3), performs image processing to interpolate lines when the quantity of lines in the sub-scanning direction in a scan of the document D is less than the required quantity of lines; performs image processing to thin the quantity of lines in the sub-scanning direction when the quantity of lines in the sub-scanning direction in a scan of the document D exceeds the required quantity of lines; performs image processing to interpolate pixels in the main scanning direction, in accordance with the enlargement factor set from the operating section, when the enlargement factor set from the operating section exceeds 100%; and performs image processing to thin the pixels in the main scanning direction, in accordance with the enlargement factor set from the operating section, when the enlargement factor set from the operating section is less than 100%. In so doing, image data of the document D can be generated from pixels in a quantity (at a resolution) in accordance with the enlargement factor set from the operating section.

Specifically, during scanning of a document in the quiet mode, the signal generating section (the first signal generating section 17 or the second signal generating section 29) generates and inputs to the stepper motor (the first stepper motor 81 or the second stepper motor 82) a pulse signal of a frequency contained within the quiet mode frequency band; and the image processing section (the first image processing section 9), when performing a scan at an enlargement factor less than an enlargement factor at which no increase or decrease in the quantity of lines in the sub-scanning direction is necessary, performs in relation to the sub-scanning direction a thinning process to thin the quantity of lines in the sub-scanning direction; or when performing a scan at an enlargement factor greater than an enlargement factor at which no increase or decrease in the quantity of lines in the sub-scanning direction is necessary, performs an interpolation process to add the required quantity of lines.

Additionally, during scanning of a document in the normal mode, the signal generating section (the first signal generating section 17 or the second signal generating section 29), when the enlargement factor is less than actual size, inputs to the stepper motor (the first stepper motor 81 or the second stepper motor 82) a pulse signal of a frequency employed when performing an actual-size scan; or when the enlargement factor is greater than actual size, generates and inputs to the stepper motor a pulse signal of a frequency obtained by dividing the frequency employed during actual size, by a set enlarging factor. The image processing section (the first image processing section 9) then performs a thinning process to thin the lines in the sub-scanning direction, when scanning a document at an enlargement factor less than actual size, and does not perform image processing to increase or decrease the lines in the sub-scanning direction, when scanning a document at an enlargement factor greater than actual size.

Additionally, the signal generating section (the first signal generating section 17 or the second signal generating section 29), when generating a pulse signal of a frequency contained within the quiet mode frequency band, generates a pulse signal of a frequency at which vibration based on rotation of the stepper motor (the first stepper motor 81 or the second stepper motor 82) is lowest. In so doing, scanning of the document D can be performed in a state in which vibration arising in the stepper motor is suppressed to the greatest extent. Consequently, the loudness of noise arising from vibration can be suppressed to a minimum level, despite rotation of the stepper motor.

The quiet mode frequency band is a frequency band in which vibration based on rotation of the stepper motor (the first stepper motor 81 or the second stepper motor 82) is a vibration level one-third or less the maximum vibration level arising during scanning in the normal mode. In so doing, scanning of the document D can be performed in a state in which vibration arising in the stepper motor is considerably suppressed, relative to vibration which may arise in the normal mode. Consequently, noise arising from vibration can be suppressed to a low noise [level], despite rotation of the stepper motor.

Additionally, the image forming device (multifunctional peripheral 100) according to the present embodiment includes the image reading apparatus 10 according to the embodiment, and the print engine section 70 for conveying the paper while performing printing on the basis of image data generated by the image reading apparatus 10, the print engine section 70 performing printing at a lower printing speed when the quiet mode has been selected, than when the normal mode has been selected. In so doing, even when scanning of the document D and printing are performed in parallel, the total amount of noise arising from the image forming device can be suppressed. Consequently, a highly quiet image forming device can be provided.

Additionally, in the image forming device (multifunctional peripheral 100) according to the present embodiment, the print engine section 70 includes the third stepper motor 83 as the stepper motor for rotating elements that rotate during printing; and the chassis-side signal generating section 73 for generating a pulse signal, and inputting the generated pulse signal to the third stepper motor 83, prompting the third stepper motor 83 to rotate at a speed in accordance with the frequency of the generated pulse signal; when the quiet mode has been selected, the chassis-side signal generating section 73 generating and inputting to the third stepper motor 83 a pulse signal of a frequency contained in a predetermined quiet mode frequency band for the third stepper motor 83, the quiet mode frequency band for the third stepper motor 83 being a frequency band such that vibration based on rotation of the third stepper motor 83 is equal to or less than a predetermined reference vibration level. In so doing, vibration arising from the third stepper motor 83 when the third stepper motor 83 is rotated for purpose of printing can be suppressed. Consequently, the noise arising from vibration during printing is low, and a highly quiet image forming device can be provided.

While the embodiment of the present disclosed has been described herein, the scope of the present disclosure is not limited thereto, and various modification may be made within the scope and spirit of the present disclosure.

What is claimed is:

1. An image reading apparatus, comprising:
a light source section for illuminating a document with light;
an image sensor for receiving reflected light from the document, and outputting image signals in single-line units in a main scanning direction;
an optical system member for directing the reflected light from the document to the image sensor;
an operating section for accepting input of an enlargement factor at which to scan the document, and for accepting selection of a scanning mode for the document, including a normal mode and a quiet mode;
an image processing section for generating image data of the document from pixels in a quantity according to the enlargement factor set from the operating section, doing so on the basis of the image signal outputted by the image sensor;
a stepper motor for prompting movement by either the document or the light source section, or both; and
a signal generating section for generating a pulse signal; inputting the generated pulse signal into the stepper motor; prompting the stepper motor to rotate at a speed in accordance with the frequency of the generated pulse signal; and, during scanning in the quiet mode, generating and inputting to the stepper motor a pulse signal of a frequency contained within a predetermined quiet mode frequency band, the quiet mode frequency band being a frequency band in which vibration based on rotation of the stepper motor is at or below a predetermined normal vibration level.

2. The image reading apparatus according to claim 1, the signal generating section, when a selection has been made from the operating section to scan a document in the quiet mode, generating and inputting to the stepper motor a pulse signal of a fixed frequency contained within the quiet mode frequency band; or, when a selection has been made from the operating section to scan a document in the normal mode, generates and inputs to the stepper motor a pulse signal of a frequency at which the document is scanned in the sub-scanning direction in lines in a quantity according to the enlargement factor set from the operating section.

3. The image reading apparatus according to claim 1, including:
a document conveying section for conveying a loaded document one page at a time towards a scanning location for illumination with light by the light source section;
the stepper motor being a first stepper motor included in the document conveying section, and adapted for conveying documents;
a document-conveyance rotating element for conveying documents being caused to rotate by the first stepper motor.

4. The image reading apparatus according to claim 1, including:
a moving section for moving the light source section, and moving the location at which a document stationed on the contact glass is illuminated by light;
the stepper motor being a second stepper motor for operating the moving section and moving the light source section.

5. The image reading apparatus according to claim 1, the image processing section generating image data according to the enlargement factor that has been set from the operating section, and performing image processing to interpolate lines when the quantity of lines in the sub-scanning direction in a scan of a document is less than the required quantity of lines; performing image processing to thin the quantity of lines in the sub-scanning direction when the quantity of lines in the sub-scanning direction in a scan of a document exceeds the required quantity of lines; performing image processing to interpolate pixels in the main scanning direction, in accordance with the enlargement factor set from the operating section, when the enlargement factor set from the operating section exceeds 100%; and performing image processing to thin the pixels in the main scanning direction, in accordance with the enlargement factor set from the operating section, when the enlargement factor set from the operating section is less than 100%.

6. The image reading apparatus according to claim 5, during scanning of a document in the quiet mode,
the signal generating section generating and inputting to the stepper motor a pulse signal of a fixed frequency contained in the quiet mode frequency band; and
the image processing section, when performing a scan at an enlargement factor less than an enlargement factor at which no increase or decrease in the quantity of lines in the sub-scanning direction is necessary, performing in relation to the sub-scanning direction a thinning process to thin the quantity of lines in the sub-scanning direction; or, when performing a scan at an enlargement factor greater than an enlargement factor at which no increase or decrease in the quantity of lines in the sub-scanning direction is necessary, performing an interpolation process to add the required quantity of lines.

7. The image reading apparatus according to claim 5, during scanning of a document in the normal mode,
the signal generating section, when the enlargement factor is less than actual size, inputting to the stepper motor a pulse signal of a frequency employed when performing an actual-size scan; or when the enlargement factor is greater than actual size, generating and inputting to the stepper motor a pulse signal of a frequency obtained by dividing the frequency employed during actual size, by a set enlarging factor; and
the image processing section performing a thinning process to thin lines in the sub-scanning direction, when scanning a document at an enlargement factor less than actual size, while not performing image processing to increase or decrease the lines in the sub-scanning direction, when scanning a document at an enlargement factor greater than actual size.

8. The image reading apparatus according to claim 1,
the signal generating section, when generating a pulse signal of a frequency contained within the quiet mode frequency band, generating a pulse signal of a frequency at which vibration based on rotation of the stepper motor is lowest.

9. The image reading apparatus according to claim 1,
the quiet mode frequency band being a frequency band in which vibration based on rotation of the stepper motor is a vibration level one-third or less the maximum vibration level arising during scanning in the normal mode.

10. An image forming device comprising:
the image reading apparatus according to claim 1, and a print engine section for conveying the paper while performing printing on the basis of image data generated by the image reading apparatus,
the print engine section performing printing at a lower printing speed when the quiet mode has been selected, than when the normal mode has been selected.

11. The image forming device according to claim 10,
the print engine section including a third stepper motor as a stepper motor for rotating a rotating element that rotates during printing; and a chassis-side signal generating section for generating a pulse signal, and inputting the generated pulse signal to the third stepper motor, prompting the third stepper motor to rotate at a speed in accordance with the frequency of the generated pulse signal; and
when the quiet mode has been selected, the chassis-side signal generating section generating and inputting to the third stepper motor a pulse signal of a frequency contained in a predetermined quiet mode frequency band for the third stepper motor, the quiet mode frequency band for the third stepper motor being a frequency band such that vibration based on rotation of the third stepper motor is equal to or less than a predetermined reference vibration level.

12. A method for controlling an image reading apparatus, comprising:
prompting a light source section to illuminate a document with light;
prompting an image sensor, on the basis of reflected light from the document, to output an image signal in single-line units in a main scanning direction;
directing reflected light from the document onto the image sensor;
accepting input of an enlargement factor at which to scan a document;
accepting selection of document scanning modes including a normal mode and a quiet mode;
generating, on the basis of the image signals outputted by the image sensor, image data of a document, from pixels in a quantity according to the enlargement factor that was set from the operating section;
prompting either a document or the light source section, or both, to be moved by the stepper motor;
generating a pulse signal, and inputting the generated pulse signal to the stepper motor;
prompting the stepper motor to rotate at a speed in accordance with the frequency of the generated pulse signal; and
during scanning in the quiet mode, generating and inputting to the stepper motor a pulse signal of a frequency contained within a predetermined quiet mode frequency band which is a frequency band in which vibration based on rotation of the stepper motor is at or below a predetermined normal vibration level.

* * * * *